United States Patent
Tait et al.

(10) Patent No.: US 8,214,235 B2
(45) Date of Patent: Jul. 3, 2012

(54) METHOD AND APPARATUS FOR ENTERPRISE RISK MANAGEMENT

(75) Inventors: Andrew M. Tait, Doylestown, PA (US); Daniel E. Garlewicz, Long Valley, NJ (US)

(73) Assignees: Core Systems Group, LLC, Branchburg, NJ (US); Andrew M. Tait, Doylestown, PA (US)

(*) Notice: Subject to any disclaimer, the term of this patent is extended or adjusted under 35 U.S.C. 154(b) by 1182 days.

(21) Appl. No.: 11/425,240

(22) Filed: Jun. 20, 2006

(65) Prior Publication Data

US 2007/0294118 A1    Dec. 20, 2007

(51) Int. Cl.
G06Q 40/00    (2006.01)
(52) U.S. Cl. ......... 705/7; 705/8; 705/9; 705/10; 705/35; 705/36; 705/37; 705/38
(58) Field of Classification Search ............. 705/35, 705/36, 37, 38, 7, 8, 9, 10; 706/20, 46
See application file for complete search history.

(56) References Cited

U.S. PATENT DOCUMENTS

| | | | |
|---|---|---|---|
| 7,401,057 B2 * | 7/2008 | Eder | 706/20 |
| 2004/0225629 A1 * | 11/2004 | Eder | 706/46 |
| 2005/0038993 A1 * | 2/2005 | Zivic et al. | 713/164 |
| 2005/0060213 A1 * | 3/2005 | Lavu et al. | 705/7 |
| 2005/0114829 A1 * | 5/2005 | Robin et al. | 717/101 |
| 2005/0197952 A1 * | 9/2005 | Shea et al. | 705/38 |
| 2006/0184473 A1 * | 8/2006 | Eder | 706/20 |
| 2006/0224500 A1 * | 10/2006 | Stane et al. | 705/38 |

* cited by examiner

*Primary Examiner* — Nga B. Nguyen
(74) *Attorney, Agent, or Firm* — Hamilton, Brook, Smith & Reynolds, P.C.

(57) ABSTRACT

A method of enterprise risk management includes defining a hierarchical organizational model to represent an enterprise. The model has a master level and one or more levels subordinate to the master level. The master level has plural materiality grades and plural probability grades, each subordinate level including one or more entities have a reporting relationship to one of the entities in the preceding level, each entity having plural materiality grades. Risk information is collected which includes risk items, each associated with a particular entity in the hierarchical organizational model and having a materiality measure and a probability measure. Selected portions of the collected risk information is output in an output view that for each selected risk item relates the probability measure to the plural probability grades and the materiality measure to either the plural master level materiality grades or the plural entity level materiality grades depending on a selected level. The output view may be presented in a graphical or tabular format. The materiality grades may be defined in financial terms and/or in synonymous terms.

20 Claims, 22 Drawing Sheets

| Risk Number | | | | | | | | | | | |
|---|---|---|---|---|---|---|---|---|---|---|---|
| Overall (organization Wide) | Function/Sub Functional number | Risk Name | Function dept name | Source of risk | Short description | Category | materiality type | materiality measure | Master Materiality | Probability/ Frequency | Person responsible | status |
| 1 | 1 | Currency Risk-Venezuela | Finance | Finance committee | Large receivable in Venezuela at old currency rates | Financial | financial | $6,000,000 | low | Very high | Joe cash | on track |
| 2 | 2 | M&A process | Finance | treasury | Lack of M&A process M&A analysis could result in failure to identify exposure | Financial | financial | $600,000,000 | Very high | medium | Bill smith | awaiting decision |
| 3 | 1 | Environmental liability | Industrial Opes | Health Safety | Environmental liability at Site in NC | HSE | financial | $8,000,000 | low | very high | Sally smith | |
| 4 | 2 | product supply | Industrial Opes | Supply chain | Lack of back up supply of critical raw material A | Operational | plant shut down | 1 year | very high | high | Steve Jones | decision needed |
| 5 | 3 | product supply | Industrial Opes | Supply chain | Product B earthquake exposure at site X | Operational | plant shut down | 10 days | low | medium | Plant manager | on track |
| 6 | 4 | Quality | Industrial Opes | QC | Quality control problems on product B at size Z | Operational | plant shut down and financial | 60 days or $200M | high | high | Peter Gracy | on track |
| 7 | 5 | Environmental liability | Industrial Opes | Health Safety | Lack of containment of hazardous material at site J | HSE | life safety | critical not acceptable | very high | high | Betsy brown | need final approval |
| 8 | 6 | product supply | Industrial Opes | Supply chain | supply interruption product a | Operational | plant shut down | 90 days | medium | low | bob smith | no action planned |
| 9 | 7 | product supply | Industrial Opes | Supply chain | supply problem product a | Operational | plant shut down | 10 days | low | very high | Dan Garly | on track |
| 10 | 8 | product supply | Industrial Opes | Supply chain | supply problem product b | Operational | plant shut down | 2 days | low | low | Bill ford | on track |
| 11 | 9 | product supply | Industrial Opes | Supply chain | supply problem product c | Operational | plant shut down | 40 days | medium | medium | Sue Divine | on track |
| 12 | 10 | product supply | Industrial Opes | Supply chain | supply problem product d | Operational | financial | $8,000,000 | low | high | john law | awaiting budget decision |
| 13 | 11 | product supply | Industrial Opes | Supply chain | supply problem product e | Operational | financial | $25,000,000 | medium | very high | Sally Jones | awaiting budget decision |
| 14 | 12 | product supply | Industrial Opes | Supply chain | supply problem product f | Operational | plant shut down | 35 days | medium | high | Joe Branch | considered on track |
| 15 | 13 | product supply | Industrial Opes | Supply chain | supply problem product g | Operational | plant shut down | 40 days | medium | medium | Gary Tech | ON track |
| 16 | 14 | product supply | Industrial Opes | Supply chain | supply problem product h | Operational | plant shut down | 30 days | low | high | Gary Tech | on track |
| 17 | 15 | Safety | Industrial Opes | Health Safety | supply problem plant 1 | Operational | plant shut down | 10 days | medium | high | Julia Stone | on track |
| 18 | 16 | Regulatory-exposure | Industrial Opes | Health Safety | air quality fine plant 1 | Financial | financial | $50,000,000 | medium | very high | Julia Stonehenge | on track |
| 19 | 17 | Regulatory-exposure | Industrial Opes | Health Safety | air quality fine plant 2 | Financial | financial | $5,000,000 | low | medium | Julia Stonehenge | monitor |
| 20 | 18 | Regulatory-exposure | Industrial Opes | Health Safety | air quality fine plant 3 | Financial | financial | $50,000,000 | medium | low | Julia Stonehenge | awaiting management confirmation of action |

FIG. 1C

METHOD AND APPARATUS FOR ENTERPRISE RISK MANAGEMENT

BACKGROUND

Enterprise risk management (ERM), also called strategic risk management, has been building momentum as an important process for corporations to implement to assure that good corporate governance exists with a company. Since the 1990's when this initiative started, ERM has been implemented within corporations by teams of consultant, focusing on developing the formal, time intensive processes to establish a basic, risk reporting process using a combination of separate tools. The consulting industry has focused on developing the human communication. There has been no attempt to integrate the processes and requirements into an integrated working tool.

SUMMARY

Embodiments of the present invention combine processes and functions that can be used to implement and manage an integrated enterprise rick management process. Using web based service applications, intelligent database management, and a detailed and thorough process that can be consistently implemented, embodiments of the present invention can provide a single place to manage, store, protect, present and track data needed for a company to implement an enterprise risk management process to better protect its stakeholders (e.g., shareholders, customers, employees, management).

Accordingly, a method of enterprise risk management comprised defining a hierarchical organizational model to represent an enterprise, the model having a master level and one or more levels subordinate to the master level, the master level having plural materiality grades and plural probability grades, each subordinate level including one or more entities having a reporting relationship to one of the entities in the preceding level, each entity having tailored plural materiality grades; collecting risk information comprising plural risk items, each risk item associated with a particular entity in the hierarchical organizational model and having a materiality measure and a probability measure; and outputting selected portions of the collected risk information in an output view that for each selected risk item relates the probability measure to the plural probability grades and the materiality measure to either the plural master level materiality grades or the plural entity level materiality grades depending on a selected level. The output view may be presented in a graphical or tabular format. The materiality grades may be defined in financial terms and/or in synonymous terms.

According to one aspect, if the selected level is the master level, the output view relates the probability measure to the plural probability grades and the materiality measure to the plural master level materiality grades for risk items associated with at least one entity and at one or more subordinate levels.

According to another aspect, if the selected level is any subordinate level, the output view relates the probability measure to the plural probability grades and the materiality measure to the plural entity level materiality grades for risk items associated with a selected entity at the selected level. The output view may further relate the materiality measure to the plural entity level materiality grades for risk items associated with at least one subordinate entity at one or more levels subordinate to the selected level.

In accordance with another aspect, collecting includes collecting risk information input by users, where each user is associated with a corresponding entity. In addition, the collected risk information may be subjected at a particular level to approval at a higher level in the hierarchical organization model.

The collected risk information may be stored in a risk information database. The individual risk items stored in the risk information database may be updated periodically and/or demand to add, delete or modify risk items.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1C illustrates data fields and sample data for the risk database.

DETAILED DESCRIPTION

Figure 1A:
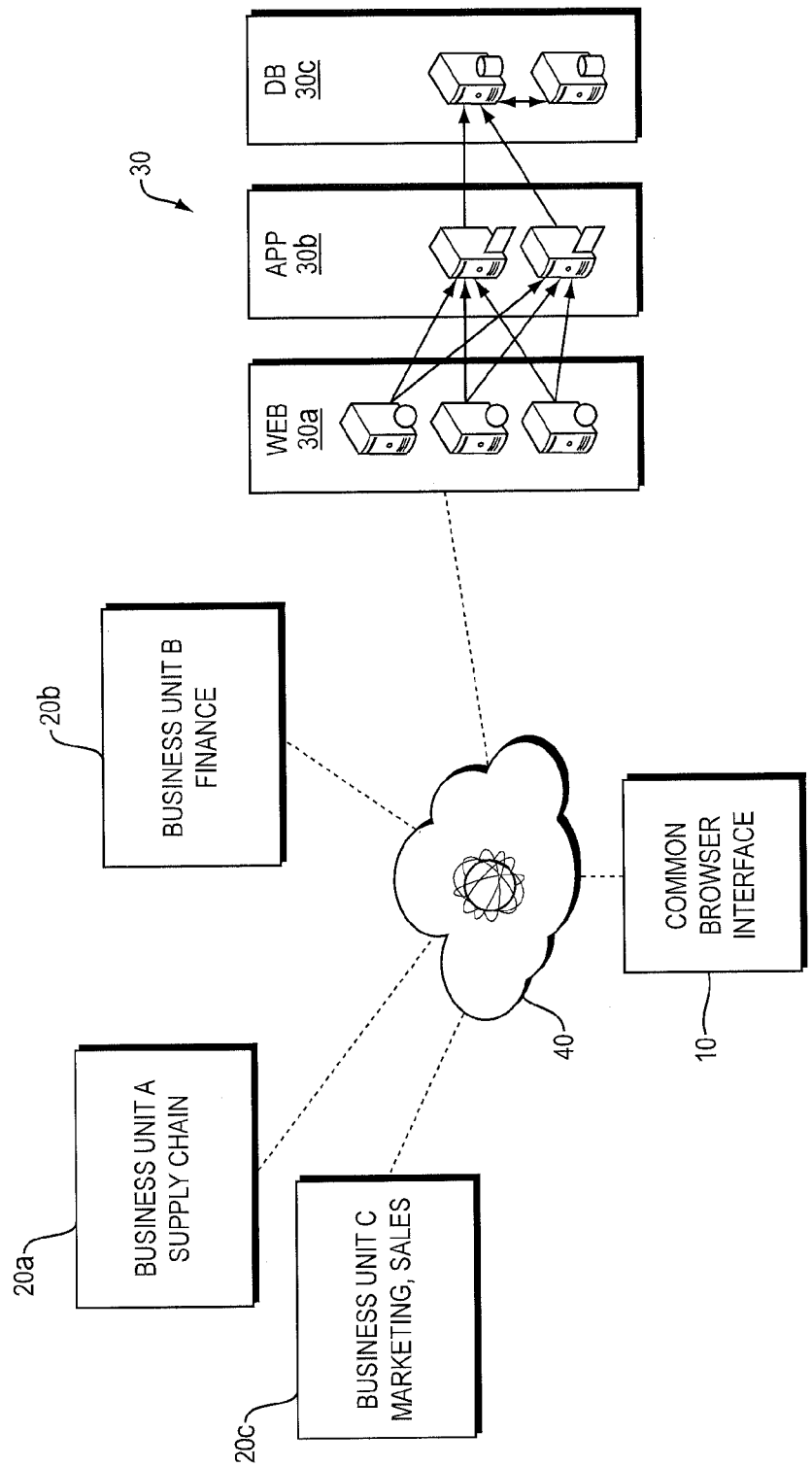
FIG. 1A is a block diagram illustrating elements of an enterprise risk management system.

FIG. 1A illustrates an enterprise risk management (ERM) system in accordance with the principles of the present invention. The ERM system includes an integrated ERM tool 30, illustrative business unit entities 20A, 20B, 20C, a browser interface 10 and a network 40. An embodiment of the integrated ERM tool 30 includes web services 30A, ERM applications 30B and databases 30C utilizing a tiered server configuration.

As described further herein, an organizational model representing master and subordinate level relationships between the business units is defined and risk information associated with the business units is collected and stored through the integrated ERM tool. The common browser interface 10 may be used by users at the level of the business unit to enter the risk information. There may be one or more instances of the common browser interface 10 to handle multiple users. Output views at master and subordinate levels may be viewed or reported through the browser interface 10.

Overview

Having described the ERM system generally, an overview of operation for an embodiment of the integrated ERM tool 30 is now described in more detail.

The tool when run initially ask the user to input initial program parameters for installation and initial database creation. The initial program parameters include master materiality levels, frequency/probability levels, and training methods.

Master materiality levels (e.g., number of levels 3, 4 or 5) and financial value of the measures are defined as the threshold points of analysis/consideration for business decisions. The financial materiality is measured against a time period (e.g., 3 months, 6 months, one year, etc.) determined by the user. The high levels of materiality are those points where the management of an organization is likely to change its view of importance of an issue and may reflect a company's unacceptable "pain" thresholds. As defined further herein, a materiality process assists users in defining recommended materiality levels for their organization. The number of frequency/probability levels (e.g., number of levels 3, 4 or 5) and definitions for frequency/probability for a risk occurring are used in combination with the materiality level of a risk to create risk maps or other graphical representations of risk information. An embodiment of the tool includes an optional process to manage tracking, distribution and validation of training. The tool manages the initial creation of the database structures to support these above parameters for utilization. Management signoff or approval for these levels can be documented in the tool.

An embodiment of the tool queries the user to establish an organizational hierarchical model to represent an enterprise. An initial organization view of ERM reporting is created that defines a so-called "risk council" master view and N−1 subordinate level views. N−1 level users are defined to be responsible for each functional and operational level of the organization. For each user, authority is defined, including delegation authority, required approval authority and other control criteria.

The tool contacts the N−1 level users to complete their registration. Registration of each user includes documenting if a person or a group needs to approve inputted data prior to them being accepted as formal from the business unit or function. There is the option to either obtain the approval from the person or group within the tool, or document in the tool the approval by the user for record only. The N−1 users may be contacted to query about further delegation down to N−2 level. The structure may be built downward until no further delegation is authorized or required.

A master organization database is defined which maintains the master view and data for users, hierarchy, business units, and all associated data in order to provide customized, client specific views. As defined further herein, the users may be queried to define synonyms for the master materiality thresholds in order to tie the risk measurement into the business language of the function or business unit. Synonyms may be defined which provide tailored definitions in units or terms more common to a specific business unit and therefore more easily applied. Examples of the synonym conversion process include converting a financial amount into an equivalent number of production days for a manufacturing division, into a number of customers affected for a sales unit, or into different levels of publicity for an investor/public relations department. An advantage of this conversion to synonyms is that each business unit or other operational or functional area now can comprehend risk information in its own operational context.

Each user may define sub-materiality levels which the business unit may want to use to manage its risk to a lower level. As described further herein, the tool relates the sub-materiality levels to the master materiality levels to provide full functionality and maintain the master view of risk for the organization.

On the initial collection of risk data, the tool contacts each user to inform them that collection of risk data is occurring. Each user inputs risk information for the business unit, functional or operational area for which the user is responsible for reporting. The risks reported generally include items or actions that can impact (to the materiality levels identified) the corresponding business unit, functional or operational area. For example, for a sales division it may include anything that can impact sales, or in any other way put the company at risk. For a manufacturing division it may include any risks to the manufacturing capability at material locations. These risks may be reported to either financial measurements or using the synonyms defined previously.

Having entered the risk information, the user approves it for release to any approval person or body required from a higher level and then it will be released up to the next level of the risk hierarchy. The next level may approve the input risk information or return questions on specific items through the tool back down to the user. This approval loop continues back up to a risk officer at the master level of the organization. The risk officer may review all risk items and send any questions down through the tool to the responsible parties. In some operational scenarios, the risk information may be subject to review by other groups such as a cross-functional group of key areas or a management board.

In an embodiment of the risk management tool, the risk information may be revised through periodic updating or through on-demand, accelerated updating. With respect to regular, periodic updating of the risk information, the risk management tool triggers (e.g., based on calendaring presets) a request to the risk officer to release a request for risk update. In advance of the information being needed, e.g., for a risk council meeting, the risk officer in turn may trigger communication down to the users to update the risk reports. In addition, the tool allows the users to generate reports they may need to discuss risk items with their relevant organization management. Changes and updates to the risk information may be tracked, with validation/acceptance of changes per the process described above in the initial risk setup.

With respect to accelerated updating, when a new risk item is identified, and the risk item cannot wait until the next reporting cycle, the user has the option in an embodiment of the tool to trigger an accelerated escalation report of risk. The tool can immediately notify the organizational hierarchy of the risk, and, based on defined parameters (e.g., does full validation hierarchy approval have to be achieved, is entire risk council contacted, etc.), the tool may notify the relevant users.

An embodiment of the tool provides customized risk review and reporting such that each user can determine the content and level of the views and reports that are generated. For example, risk items can be sorted by any of the stored field, and reports support multiple views of the risk information.

The different stakeholders in an organization implementing enterprise risk management that can benefit from the risk management provided by the risk management tool may include the strategic risk officer, the risk council, the functional risk representatives and the management board. Roles of the risk officer may include providing leadership, vision and direction for the strategic risk management process; ensuring that events that can materially impact the business objectives of the company are identified and understood; ensuring that senior management is made aware of which risks are most important and what is at stake; ensuring that the risk management process and actions are being executed and that corporate learning is taking place; working towards the creation of a risk intelligent culture at the company.

The risk council generally may be constituted as a cross-functional group, made up of representatives from key organizational functions, having the responsibility for the risk reporting process within that function. A primary purpose of the risk council is to assist the risk office in reporting to the management board of the company on risks that could impact the company. Specific duties of the risk council may include collecting, cross-functional evaluating, and prioritizing risks across the company. In embodiments of the invention, this may include preparation of a company risk report of the most critical specific business risks for review by the management board. In other embodiments of the invention, additional duties of the risk council may include reviewing and monitoring implementation timelines of suggested action plans to manage risks; reviewing processes utilized by functions to report risk; providing recommendations to the management board regarding key business processes that should be reviewed to determine possible areas of risk; collaborating on processes and communications to build risk understanding in the company and foster a culture of courage in risk reporting.

The functional risk representative represents a corresponding function on the risk council. These representatives may have the responsibility of overseeing the risk reporting process in that function. The specific duties of the functional risk representative may include ensuring that a process is in place to routinely collect information regarding risk from the respective function; ensuring that an appropriate evaluation of the impact of each risk has been done by the function; working with the head of the function and responsible functional managers to ensure that a suggested action plan to manage risks has been developed, and that the approved action plan is implemented on time; providing periodic risk reports to the risk officer; attending risk council meetings and communicating functional risk to the council; ensuring that information regarding risks that could impact the function is communicated back to the leadership of that function; serving as the point person for the function regarding all risk.

The management board can take advantage of the risk management tool through periodic review of prioritized risk reports from the tool provided by the risk officer and the risk council. The management board may determine materiality of risks, review suggested actions plans corresponding to risks reported by the risk officer and approve appropriate plans. Other tasks may include monitoring the progress of implementation of approved action plans; reviewing recommendations from the risk council on processes to be reviewed, and deciding on appropriate follow-up; fostering an environment within the company that will facilitate the development of a risk intelligent culture; providing guidance to the organization on the risk tolerance position that the management board wishes to follow.

DESCRIPTION OF PREFERRED EMBODIMENTS

Figure 1B:
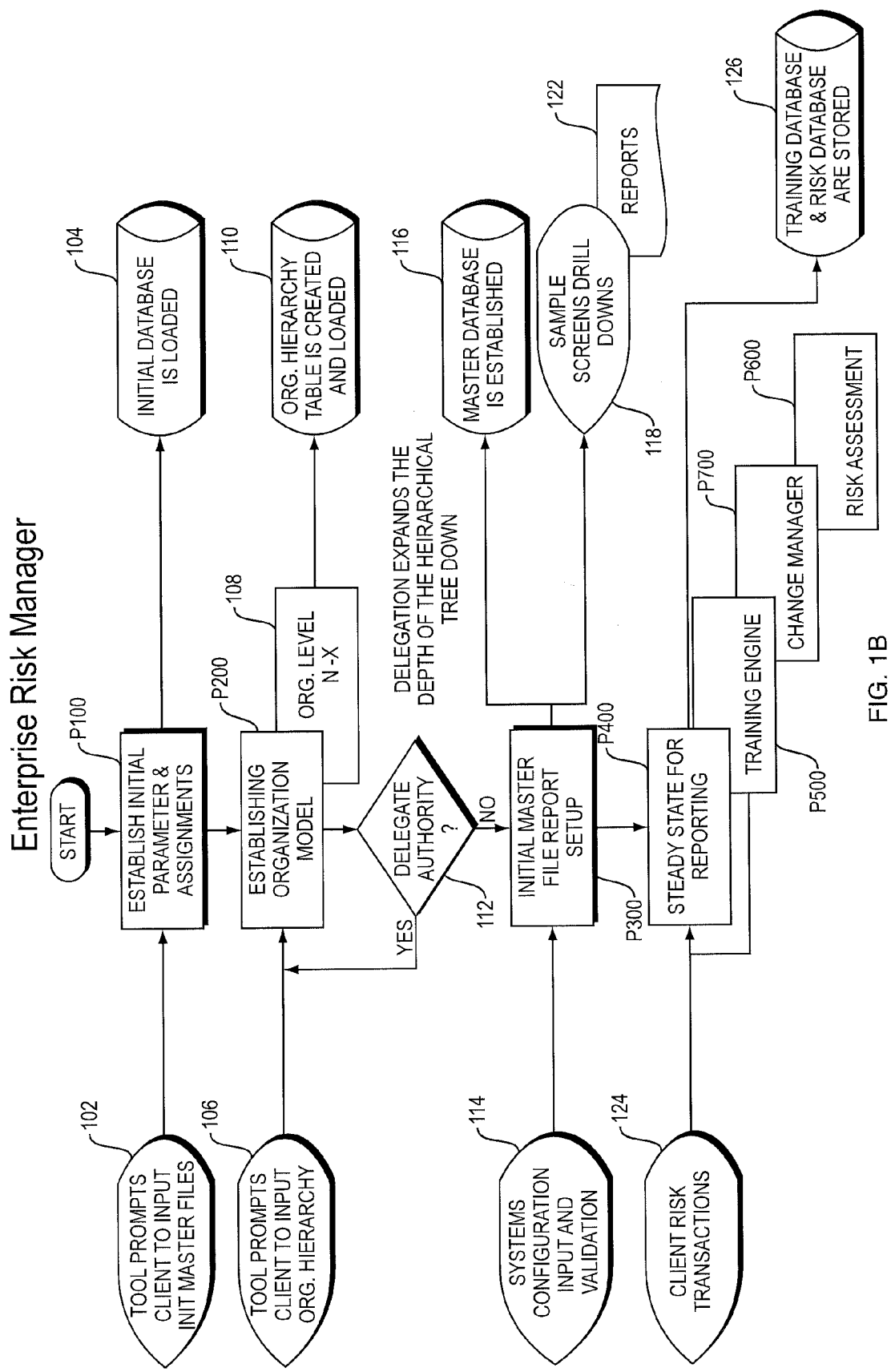
FIG. 1B illustrates a flow diagram of an enterprise risk management tool of the system of FIG. 1A.

FIG. 1B illustrates a flow diagram of the process elements for an embodiment of the ERM tool. The enterprise users work through an initial parameter establishment procedure P100 using input information 102 that creates the initial database structure 104. After the initial database structure is created, a user/organizational hierarchy P200 procedure creates an organizational hierarchy table or tree structure 110 which may include multiple organization layers and varying user access/security input at 106 and with delegated authority 112. An initial master file report setup procedure P300 collects and builds the initial risk report 122, sample screens/drill downs 118 and populates the master database 116 based on systems configuration input and validation 114.

After P300 is completed, the tool takes the users organization into steady state reporting P400 and process management based on client risk transaction inputs 124. The tool allows the user to include continued training management P500, change management P700 and risk assessment P600, described further herein. Results are provided to training database and risk database storage 126.

FIG. 1C illustrates data fields and sample data for the risk database. The fields may include the risk number on an overall master level and at the business entity level; risk name; functional business entity name; source of risk information; short description; category; materiality type; materiality measure; master materiality; probability/frequency; responsible person; status.

Figure 2:
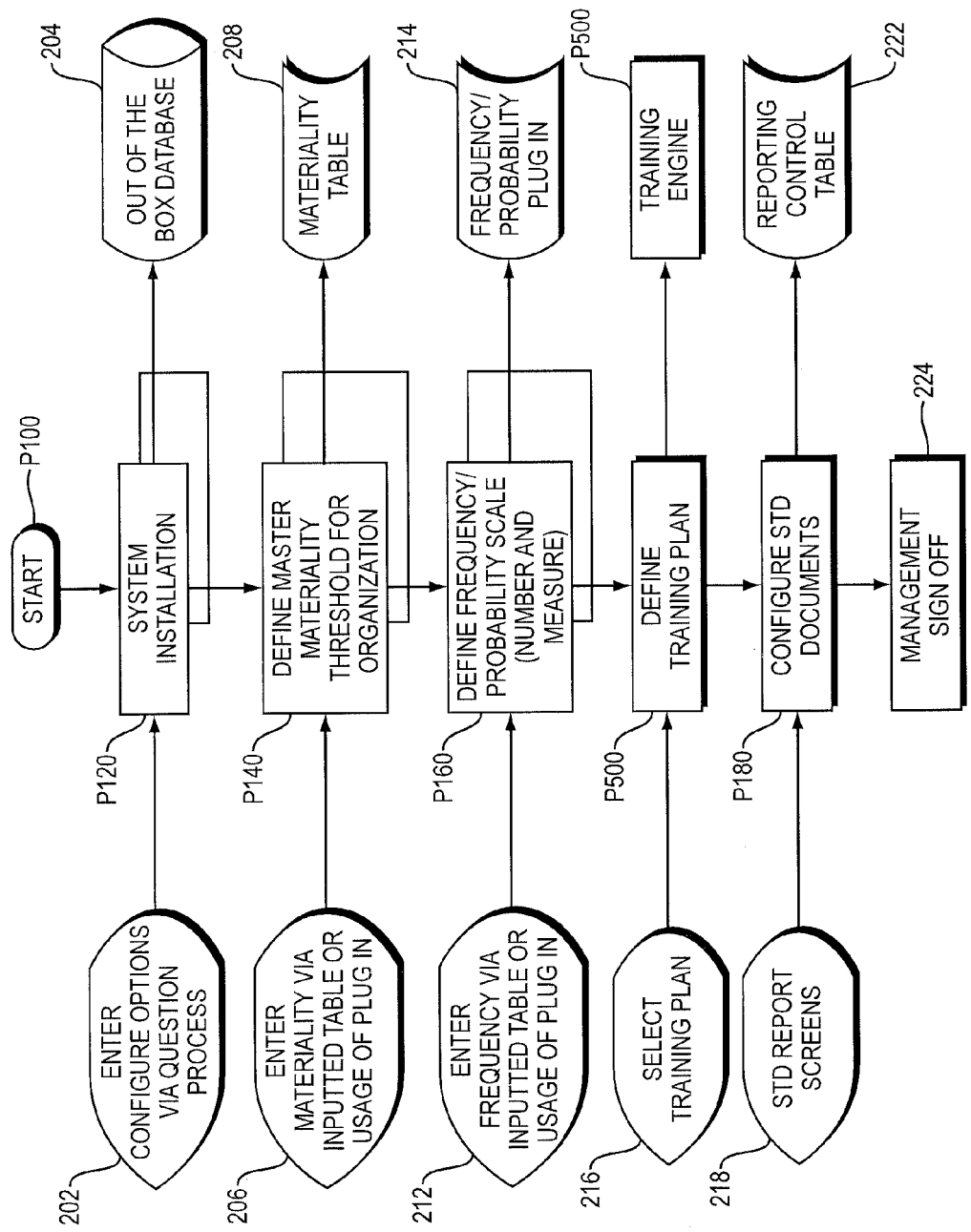
FIG. 2 illustrates a flow diagram of an initial parameter and assignment routine of the tool shown in FIG. 1B.

FIG. 2 is a flow diagram for the process that established initial parameter and master definition settings P100. Based on user inputs 202, the tool takes the user through a configuration process P120 which defines tool owner and administrator, addresses technical set up (e.g., does the company have an active directory which can be access for user data/security) and user business specific (e.g., name of company, type of company, size, class, etc.) queries to establish master parameters in "out of the box" database 204. After the initial configuration is created, the tool asks the user through input 206 for master materiality P140 (e.g., number of levels and size of each level) to define materiality table 208. This process P140 allows the user to define the number of grades or levels (e.g., 3, 4, 5), the names of the grades or levels (e.g., low, medium, high, very high, minimal, moderate, severe, critical) and the master financial triggers for each level in a fixed currency (e.g., dollars or Euros). These financial grades or levels may be decided and inputted into the system by the user, or the tool may assist the user in determining these levels based on the company size, business and strategic issues, for example, using a rules-based query. P140 creates the master materiality database components 208.

The tool queries the user 212 to define probability measurement P160 (number of levels and definition of each). This allows the user to define number of grades or levels (e.g., 3, 4, 5) of frequency, the names of frequency (low, medium, high, unlikely, likely, probably, expected, etc), and definitions of these names (chance per years, percentage, etc). These probability grades or levels may be decided and inputted into the system by the user, or the tool may assist the user in determining these levels based on the company size, business and strategic issues, for example, using a rules-based query. P160 creates the master frequency/probability database components 214.

Next the tool walks the user through selecting a training plan 216 using training plan definition and training engine P500.

After master materiality and frequency databases have been created in P140 and P160, the tool creates, through standard report screens 218, the master standard documents P180 to populate the master reporting tables 222 and reports including customized authority levels and access. These will then be available for management sign-off 224.

Figure 3:
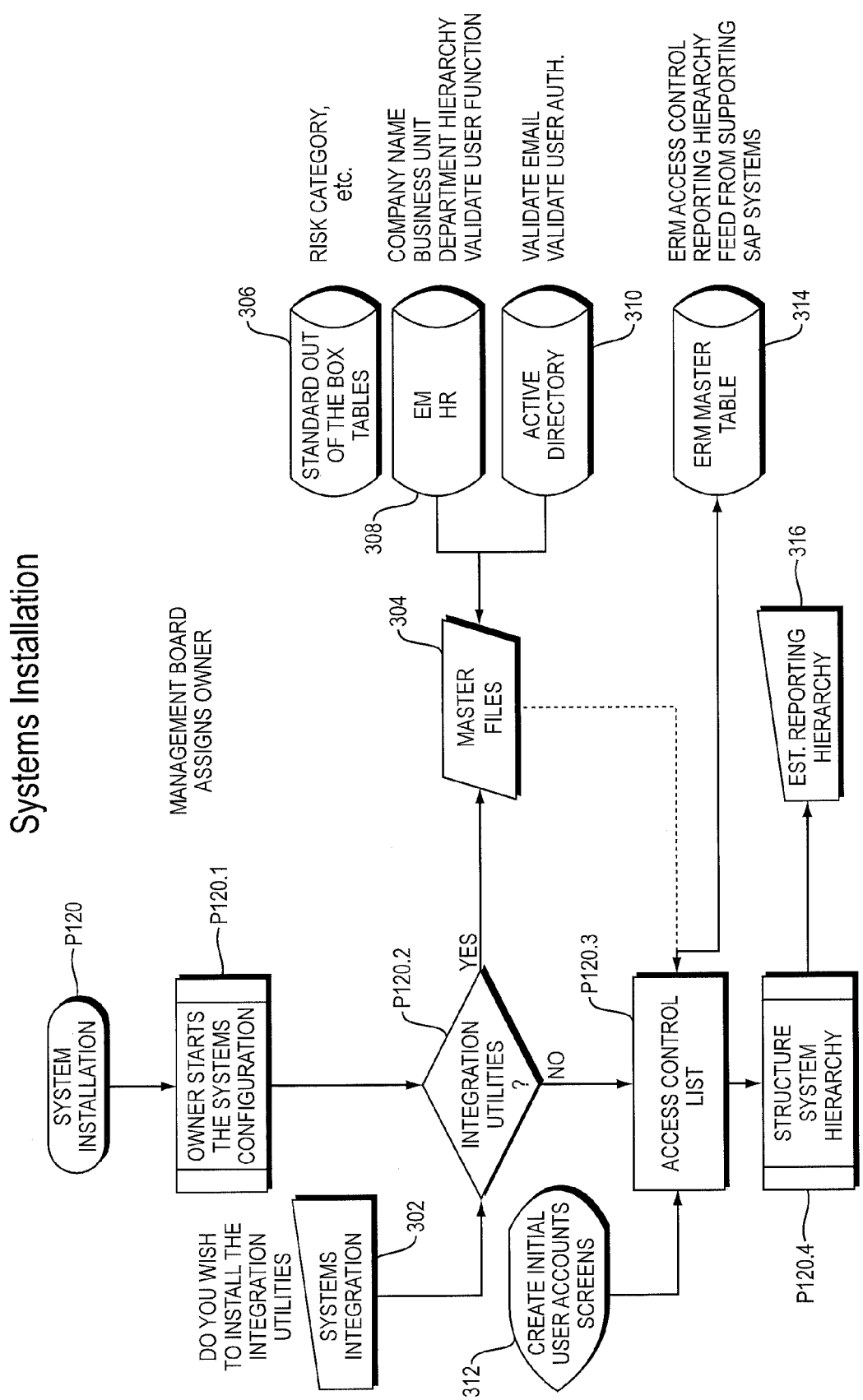
FIG. 3 illustrates a flow diagram of a system initialization subroutine of the routine shown in FIG. 2.

FIG. 3 represents how an embodiment of the tool establishes initial system configuration parameters P120, system environment and initial master database tables/files P120.1. The tool prompts the user 302 through a series of configuration questions. The first set of questions identifies the type of environment and technology being used. Questions address which server/servers will be utilized, which databases are to be used (e.g., Oracle, SQLserver) and where in the network does the database server reside. Upon answering these questions, the system validates the questions by checking the servers and returning confirmation that the question responses are valid for installation. The system then installs the application objects and the initial ERM database files on the server(s).

The tool prompts the user P120.2 through questions related to integration to allow the ERM environment to talk to other support systems that contain information that the ERM system needs in order to reduce administration time. The tool may integrate with the company's resources (e.g., active directory 310) and standard "out-of-the-box" tables 306 and with user authentication information and resource management systems (SAP, PeopleSoft, etc.) 308. If the user does not wish to install the integration utilities, the system brings the user directly to administrators user authorization application (access control lists).

Figure 7:
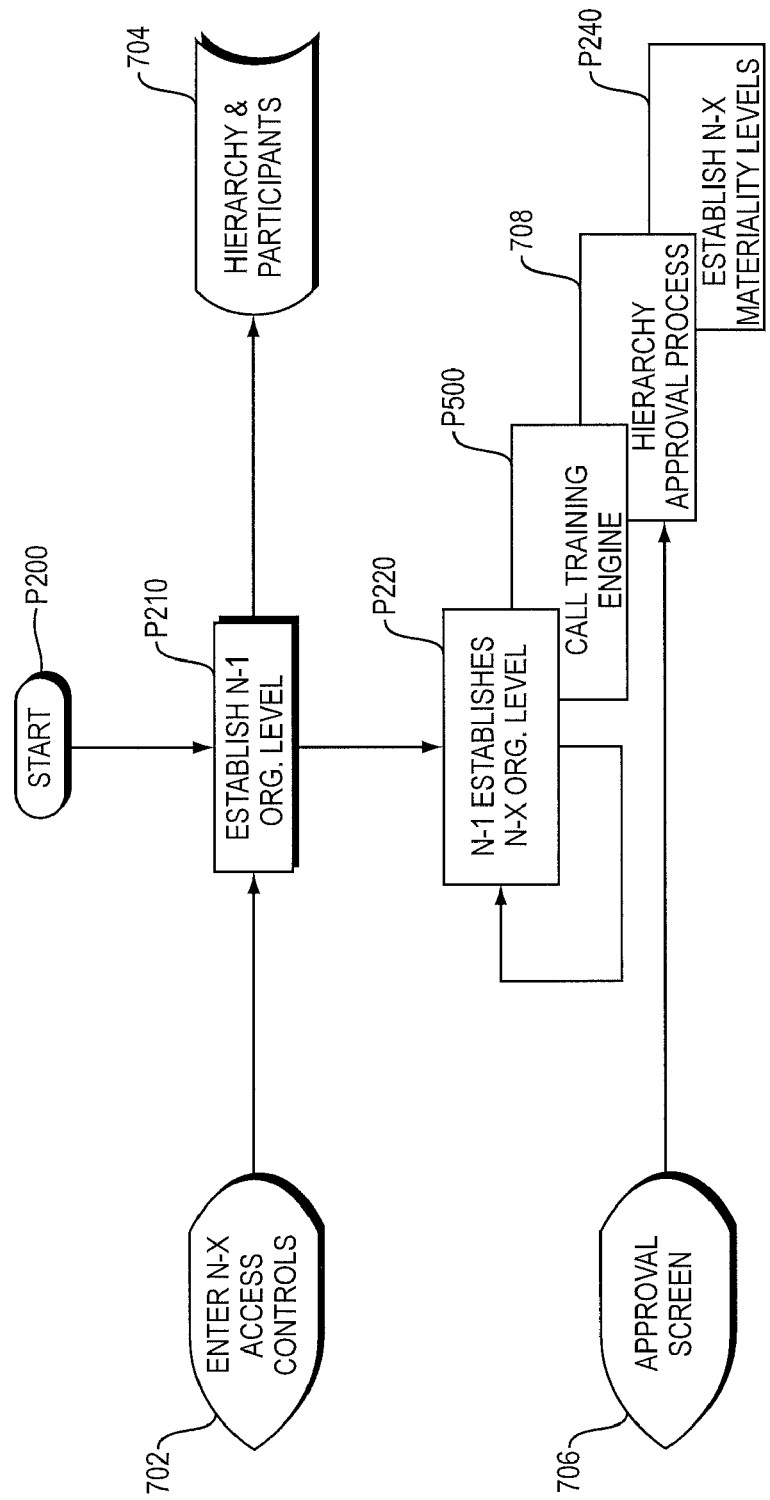
FIG. 7 illustrates a flow diagram of an organizational model routine of the tool shown in FIG. 1B.

P120.3 Access Control Lists: this application allows the user to input the administrator information of the ERM solution. Upon completing the administrator information, the system then advances the user through establishing the organization hierarchy structure P120.4 to establish reporting hierarchy 316, which is developed in P200 (FIG. 7). If the owner had selected to link to active directory systems 310 ('yes' in P120.2) then the tool obtains user data and security from the Master files 304 and only asks for those fields which were not automatically populated. If the owner selected 'no' at P120.2 the tool asks the owner to provide all needed data.

Figure 4:
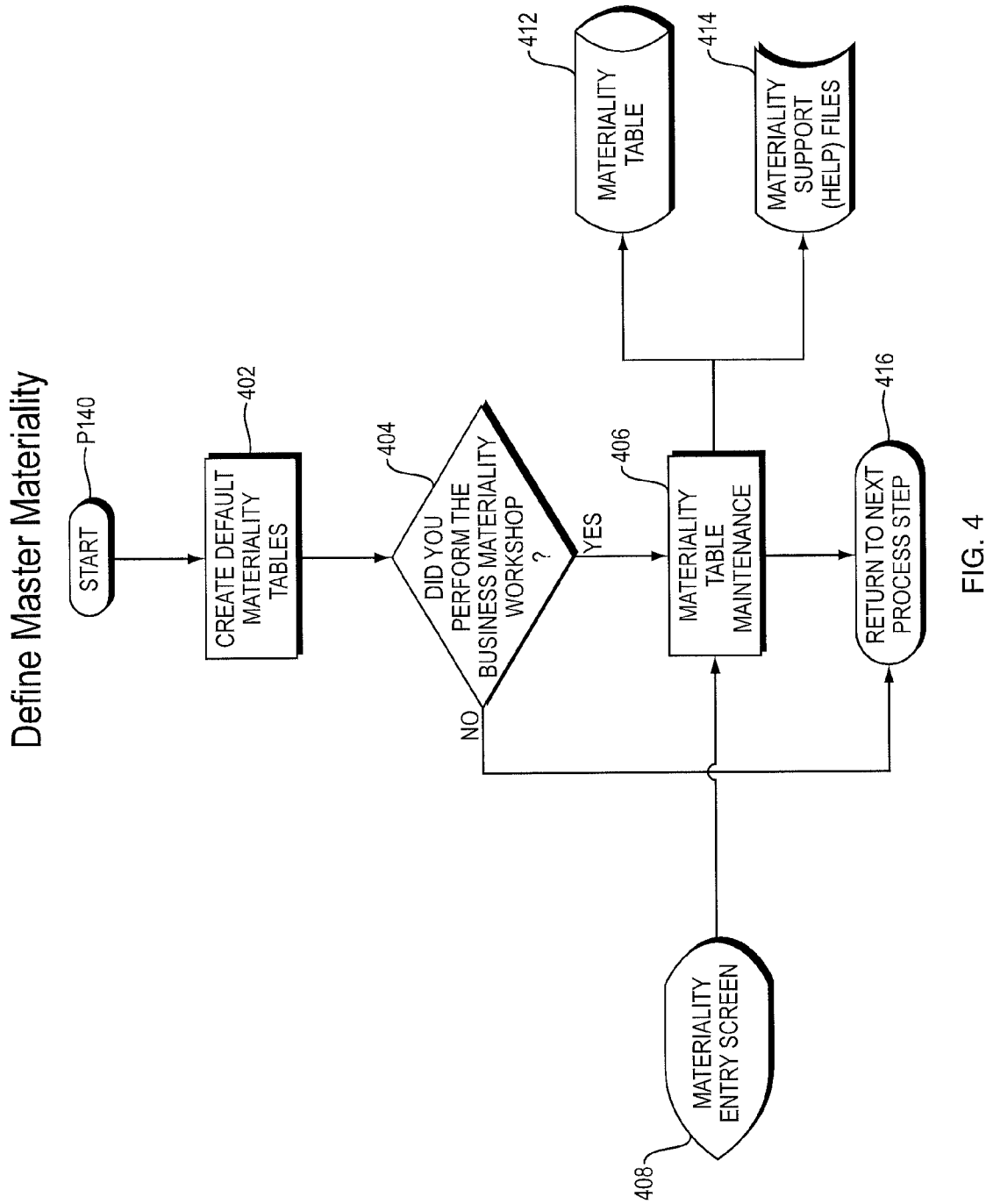
FIG. 4 illustrates flow diagram of a master materiality subroutine of the routine shown in FIG. 2.

FIG. 4 is a diagram that represents how the tool allows the user or administrator the ability to input, change or remove the financial materiality threshold P140. Initially at 402, default materiality tables are created. The administrator may enter data into the materiality database table 412 through an entry screen 408 for materiality table maintenance or updating 406. Help files are available at 414. A business materiality workshop query 404 may be included for determining access to the table maintenance. At completion, the processing continues from 416.

Figure 5:
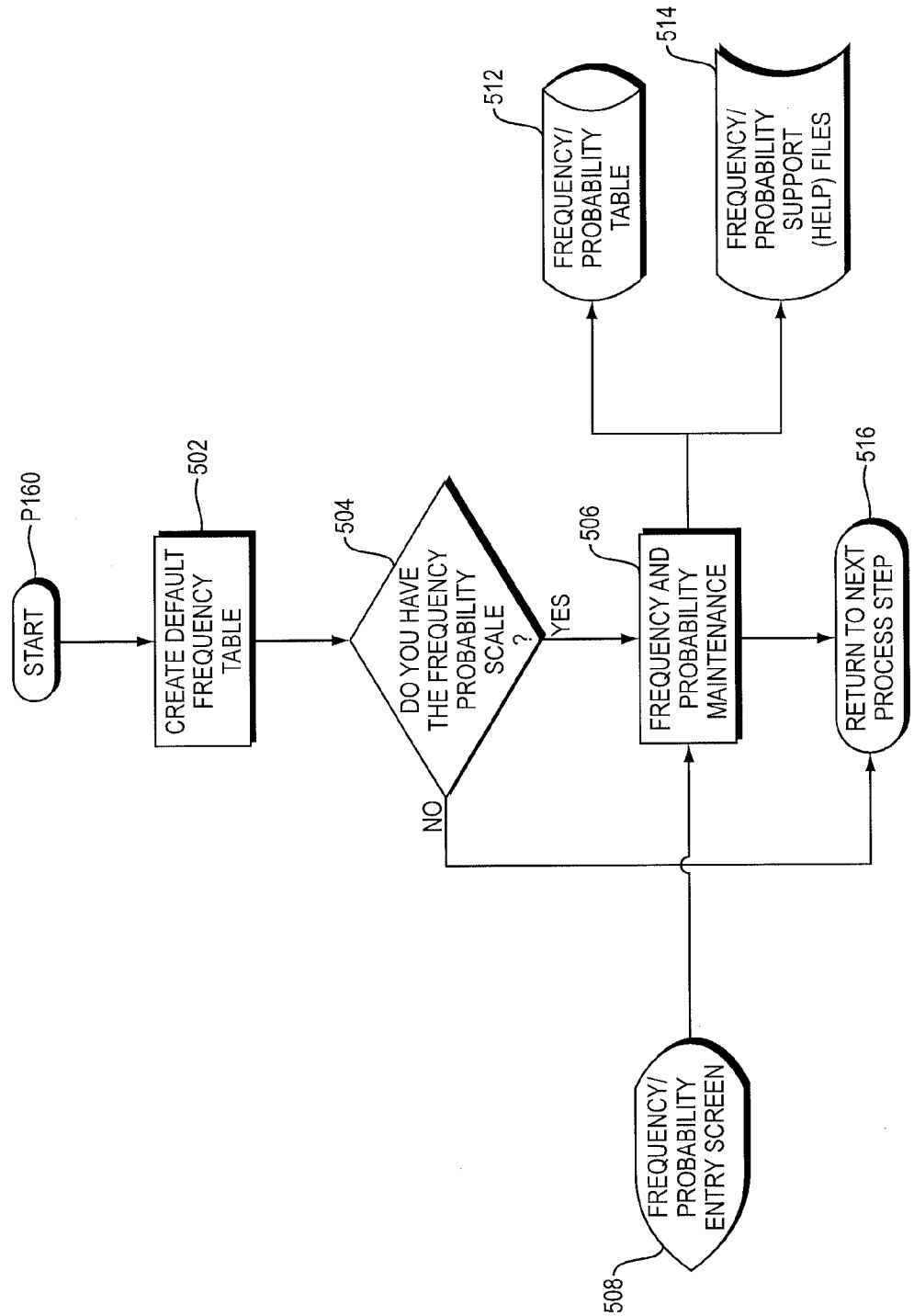
FIG. 5 illustrates a flow diagram of a frequency/probability subroutine of the routine shown in FIG. 2.

FIG. 5 is a diagram that represents how the tool allows the user or administrator the ability to input, change or remove the definition of frequency/probability scale P160. Initially at 502 a default frequency table is created. The administrator may enter data into the frequency database table 512 through an entry screen 508 for frequency table maintenance or updating 506. Help files are available at 514. A query 504 determines whether the user has a frequency/probability scale to input. At completion, the processing continues from 516.

Figure 6:
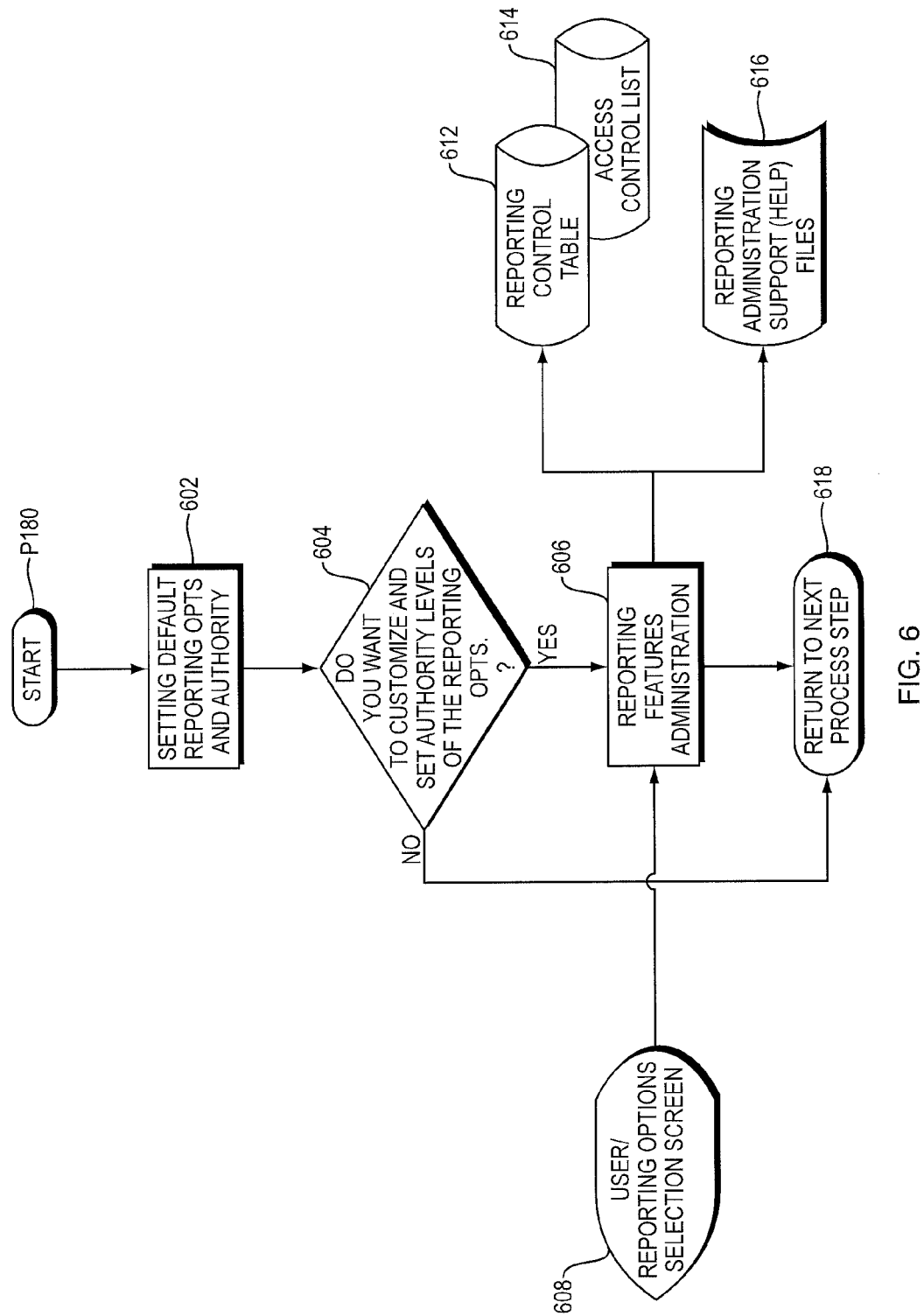
FIG. 6 illustrates a flow diagram of a reporting configuration subroutine of the routine shown in FIG. 2.

FIG. 6 is a diagram that represents how the tool gives the user or administrator the ability to establish/change the system default reporting options P180. The reporting option have the flexibility to change the authority by user, user group, and overall system reporting modules. Initially at 602, default reporting options and authority are set. The administrator is queried at 604 to determine whether to perform customization activity. If 'yes', the system launches a web application 606 for configuring the reporting options. The reporting options are entered through a selection screen 608 with the results sent to reporting control table 612 and access control list 614. On completing the task or answering 'no' the system returns the user back to the next step in the level on process 618.

Figure 8:
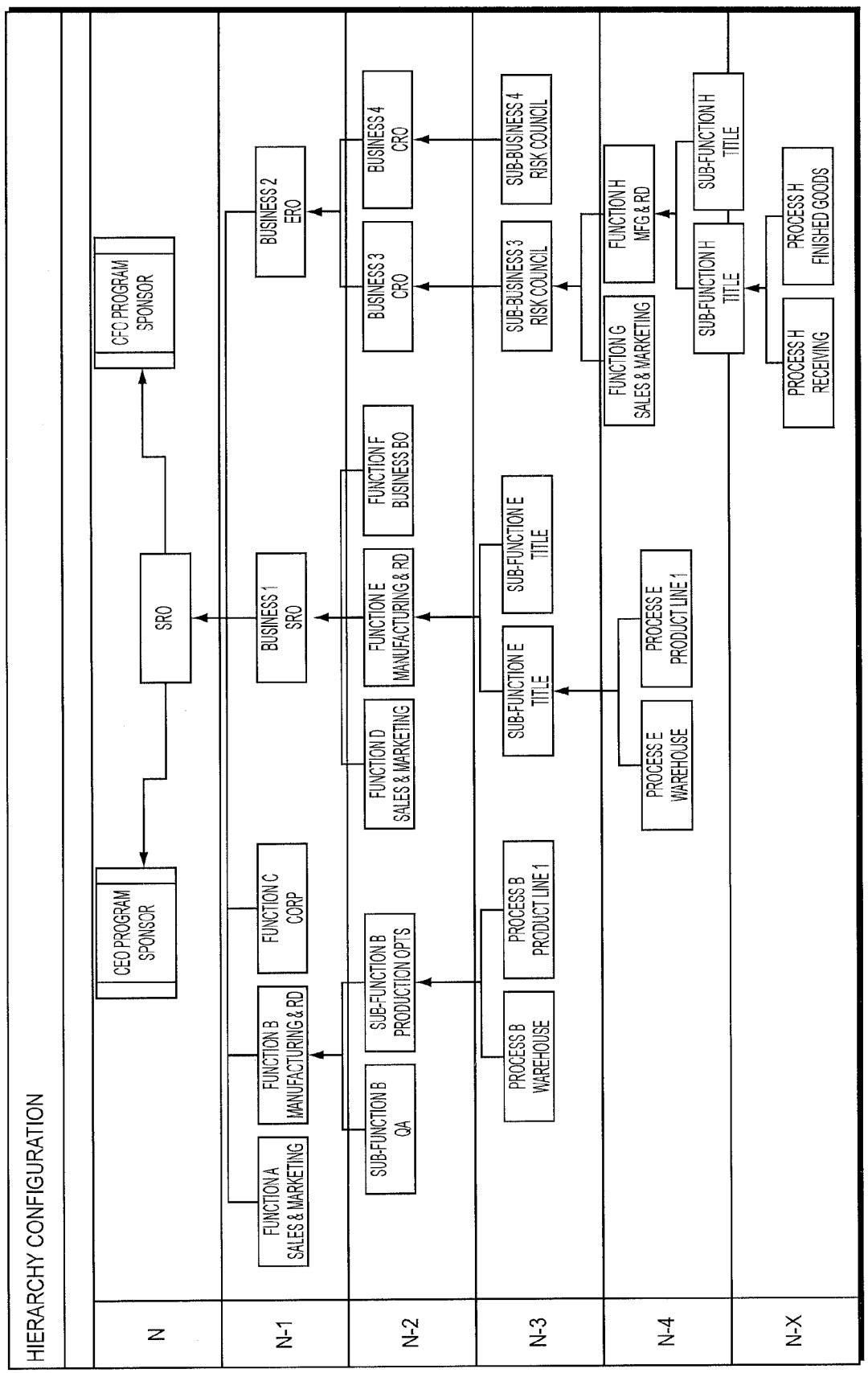
FIG. 8 is a diagram that illustrates an example hierarchical organizational configuration.

FIG. 7 is a diagram that represents how an embodiment of the tool leads the user through the establishment of the organizational model P200. The tool asks the user or administrator to input the major business units and corporate functions of the organization and the assigned risk coordinator for each P210. The tool may include pre-populated functional names and may allow for multiple master business units. The tool asks for specific information for each user. If active directory function was created in P100, then this data automatically accesses and loads into database. User data includes name, title, organization, business unit, email address, phone, fax, supervisor, risk reporting supervisor, etc. The tool asks the administrator to define functional access rights for each of these users 702, including risk validation requirements (e.g., approval regarding the risk inputs before being formally accepted or changed) and authorized access (across functions, or up and down organization). The N−1 user organization structure is then created in the database and organizational hierarchy 704. FIG. 8 illustrates an example of an organization hierarchy.

The tool then contacts the N−1 users P220 to create/complete the following:

Is there delegation below N−1 for the function/business represented by N−1.
If Yes, then
Identify delegates and their sub function/business area of responsibility;
Identify their authority level;
Identify if items input must be approved and confirmed by N−1 before they are formally accepted or changed;
Identify if the delegated user is allowed to further delegate/divide the reporting;
If Yes—does N−1 have to approve the delegation.
Sub user is created in database
This loop is repeated with sub user N−2 and repeated until no more delegation is possible.
The risk hierarchy is created (see FIG. 8).
All users access of selected training modules, and by the hierarchy (N−2 is directed by N−1 and overall owner). Training Module P500 is accessed.
The tool automatically, and with user input, personalizes the customized view, including links to other assessable risks.
Each level of the hierarchy can select which levels or sublevel can have approval of risks before they are released. A business unit may decide that all of its sub units for reporting will have their compiled risk report validated by their functional management committee before it is released to risk process owner. This is built into the tool.

The tool then contacts user N–1-N-X to determine if the sub function/business levels want or need to have different materiality levels built within the master materiality levels to allow the sub function/business to manage risk reporting to lower levels. It yes, then the tool asks the user for function/business sub materiality P240 to identify what subset materiality levels are called (low, medium, high, very high, minimal, moderate, severe, critical) and the financial triggers for each of these levels in a fixed currency (dollars or Euros). The tool creates a more granular database which includes all master levels created in P140 and these additional sub-levels, listed by increasing order or significance. These multiple layers may be utilized to map risks on both a function and master level per the definitions of each specific level.

Figure 9:
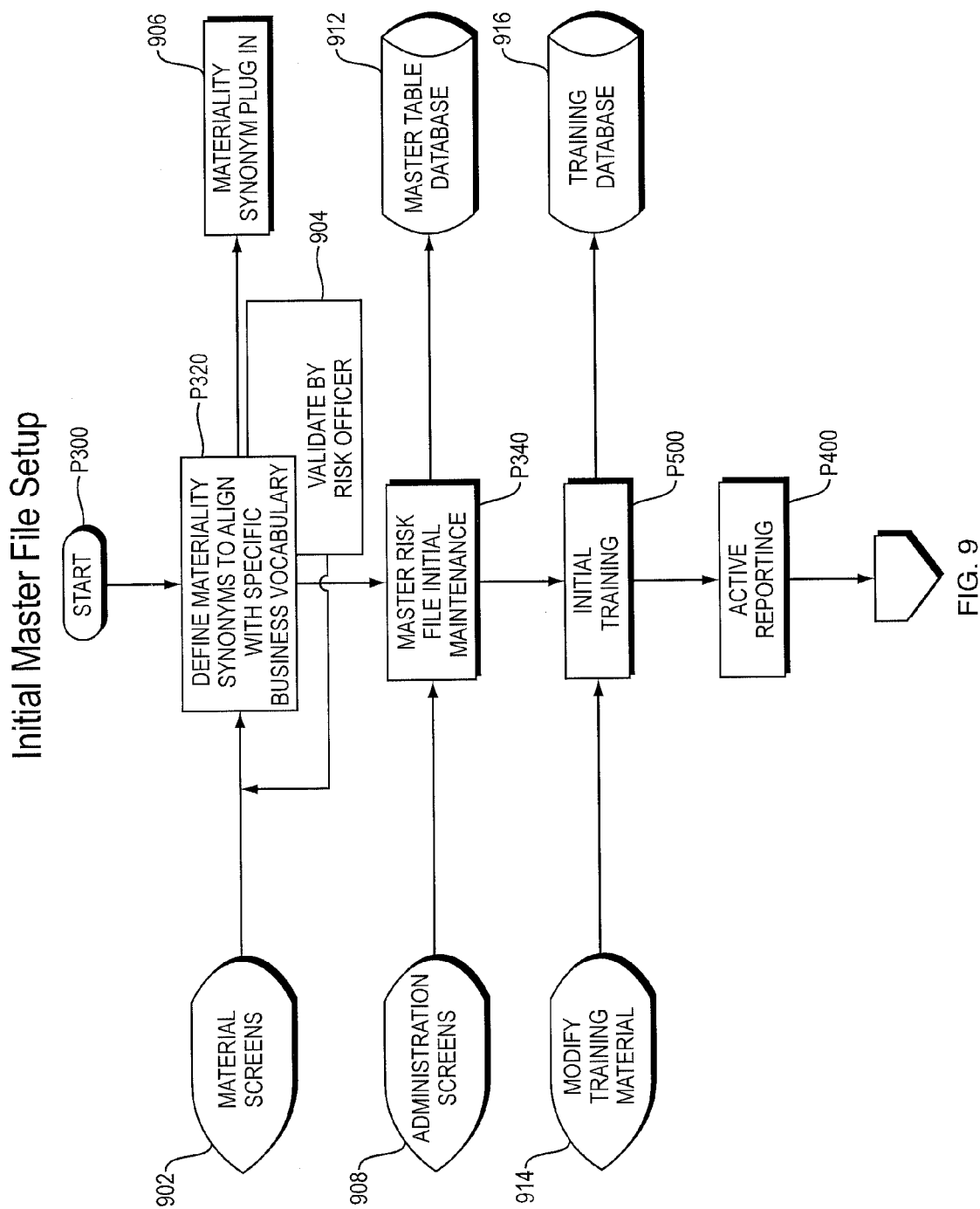
FIG. 9 illustrates a flow diagram of an initial master file setup routine of the tool shown in FIG. 1B.

FIG. 9 is a diagram that represents how the tool completes the master database creation P300 with risk synonyms and collects the initial risk report and completes the initial population of the database. Inputs include material screens 902, administration screens 908 and training material modifications 914.

The tool contacts each business unit/function risk owners and collects risk synonyms for each of the materiality grades or levels P320 to define a business unit equivalence of the financial figures. Synonyms are developed optionally using assistance of a plug-in process 906 which provide tailored definitions in the units more common to a specific business unit.

The tool then contacts the sub risk owners to further define their synonyms, either for the sub materiality levels added, or to develop further synonyms for the master levels. These are then validated 904 by risk officer before continuing.

The tool completes the master risk database framework P340 and finalizes the master table database 912. The tool calls on and sends out requirements for any final training as defined in the training module P500 with training database 916.

An embodiment of the tool then triggers into P400 active reporting.

Figure 10:
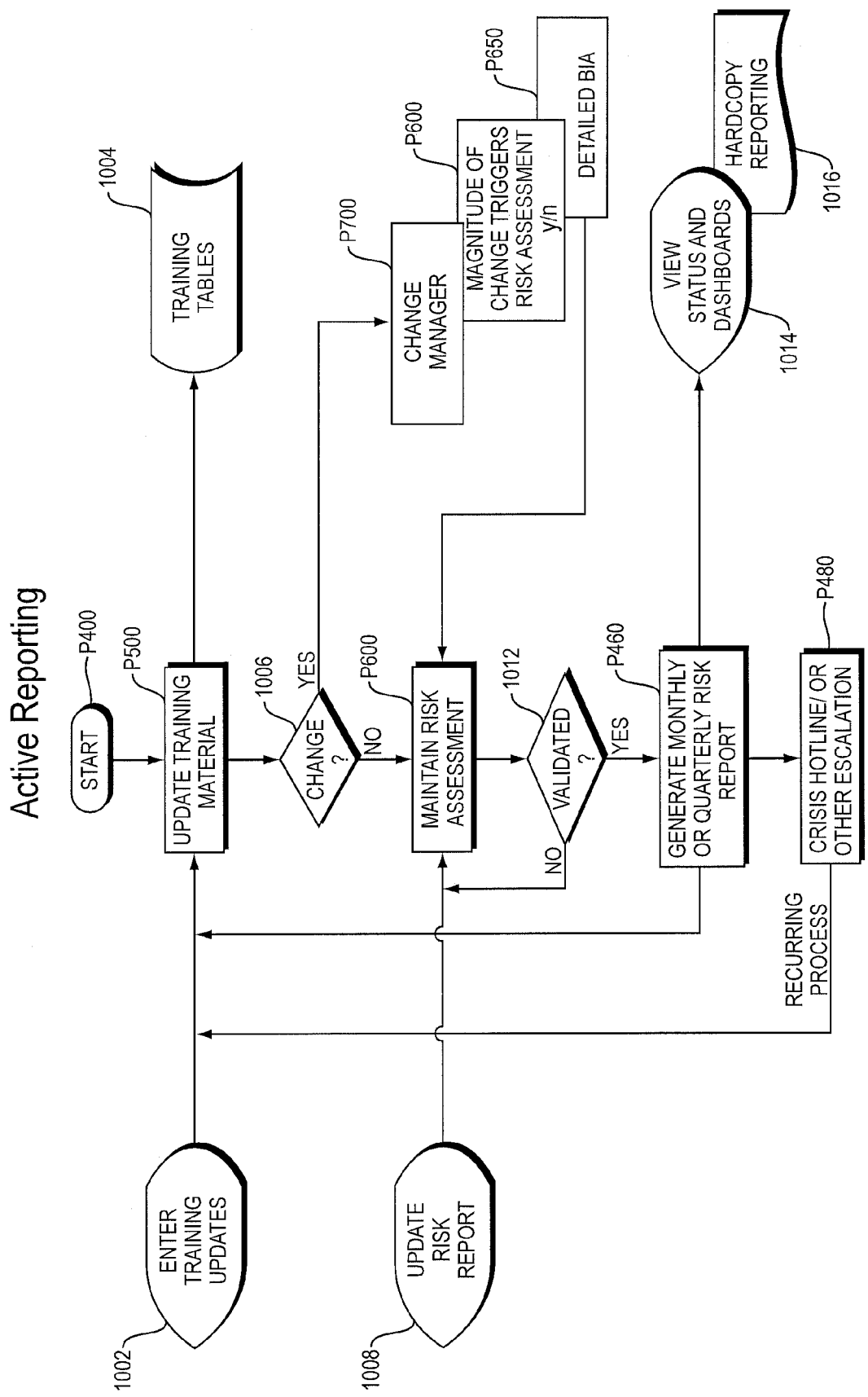
FIG. 10 illustrates a flow diagram of an active reporting routine of the tool shown in FIG. 1B.

FIG. 10 is a diagram that represents how the tool conducts the active risk reporting from the business P400.

The risk officer may enter updates 102 through training module P500 to the training tables 1004. The tool queries 1006 to find if there have been any changes in the organization which would warrant the activation of a change manager P700. If there is change which is material, this activates an optional detailed business impact Assessment (BIA) process P650. In addition, the risk officer may trigger updates of the risk assessment/reporting module to update the risk database P600. The tool sends (with approval of the risk officer 1012) the validated updated risk list to the Risk council as a draft validated risk report P460 with hardcopy 1016. The tool may also update dashboard components for various users 1014. The dashboard components relate to a graphical user interface for viewing risk information in graphical or tabular formats, such as risk map views described further herein.

The tool may prompt the users to provide updated risks 1008. Questions generated about specific risks are pushed by the tool, back through to end user who provided the input. The tool may trigger optional crisis hotline/escalation P480 for any urgent new risks which need to be reported immediately up the chain.

Figure 11:
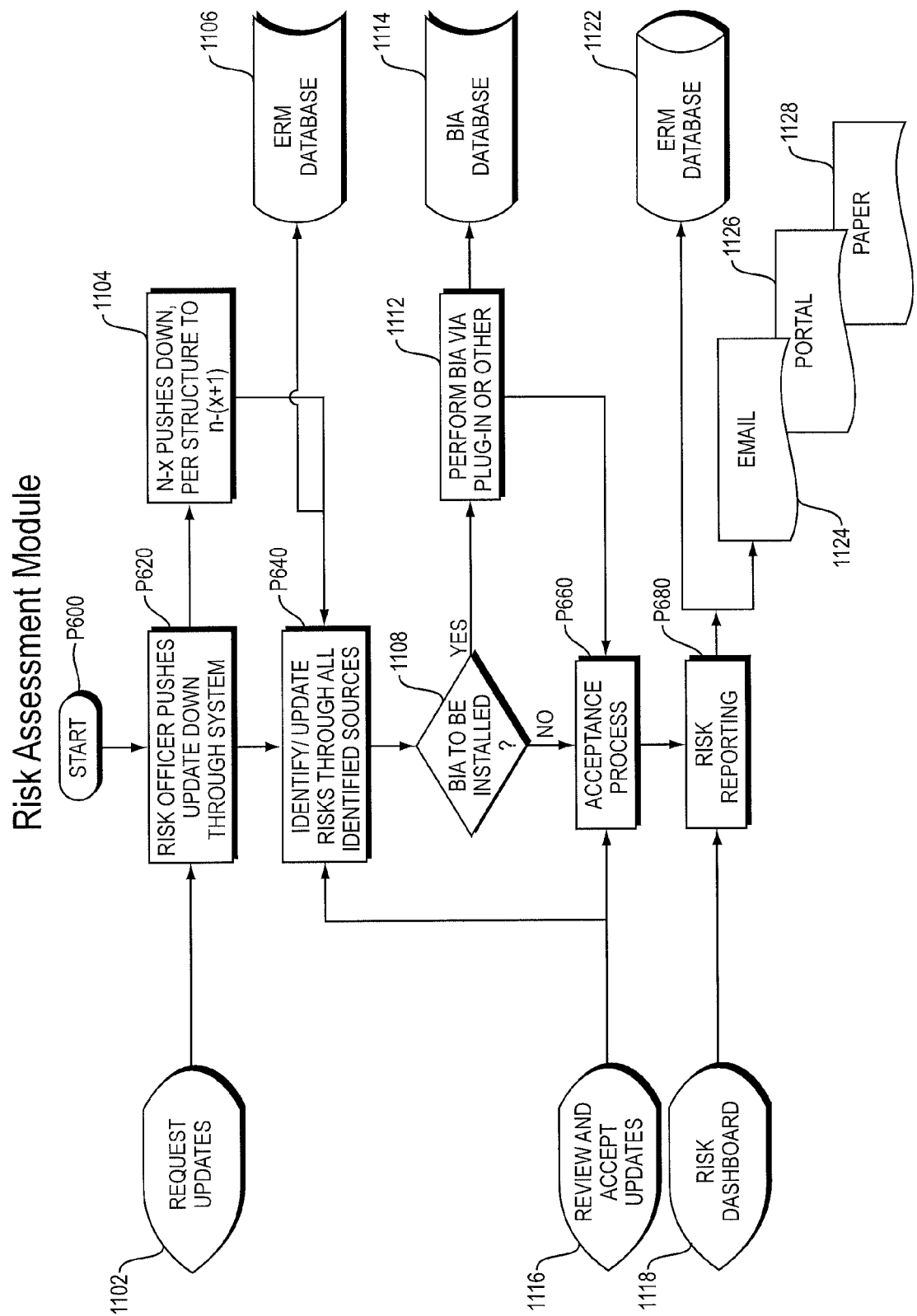
FIG. 11 illustrates a flow diagram of a risk assessment routine of the tool shown in FIG. 1B.

FIG. 11 illustrates the assessment module P600 for collecting the risk assessment reports from users. In this process, the risk process owner or administrator instructs the tool to trigger the risk reporting/updating process. The tool pushes P620 any existing reported risks down to user N–1 at 1104. User N–1 reviews the risks received and either pushes risk down through the tool to a sub user or keeps the risk for updating 1102. The tool prepares an update P640 to the risk database 1106, to be validated by the hierarchy. If user setting define that the risk does not need to be updated by the hierarchy, it is inputted as a draft update through hierarchy.

The tool may track changes and updates with time and date stamp, user ID, and maintains complete version control with rollback functionality.

If the user has elected at 1108 to include BIA, then BIA is performed at 1112 to provide BIA database 1114.

The tool presents those items that need to be validated (based on user profile) to hierarchy for specific acceptance P660. The hierarchy accepts the update 1116 which sends it up through the process as a normal update, or challenges the update, inputs a question to the end user, and then triggers the tool to send it back to end user to address questions.

The tool presents updated draft validated risk list to risk officer for viewing 1118. The tool populates all risk reports P680 with the draft update/new risk information and updates the database 1122, risk reports (email 1124 and paper 1128), portal 1126.

Figure 12:
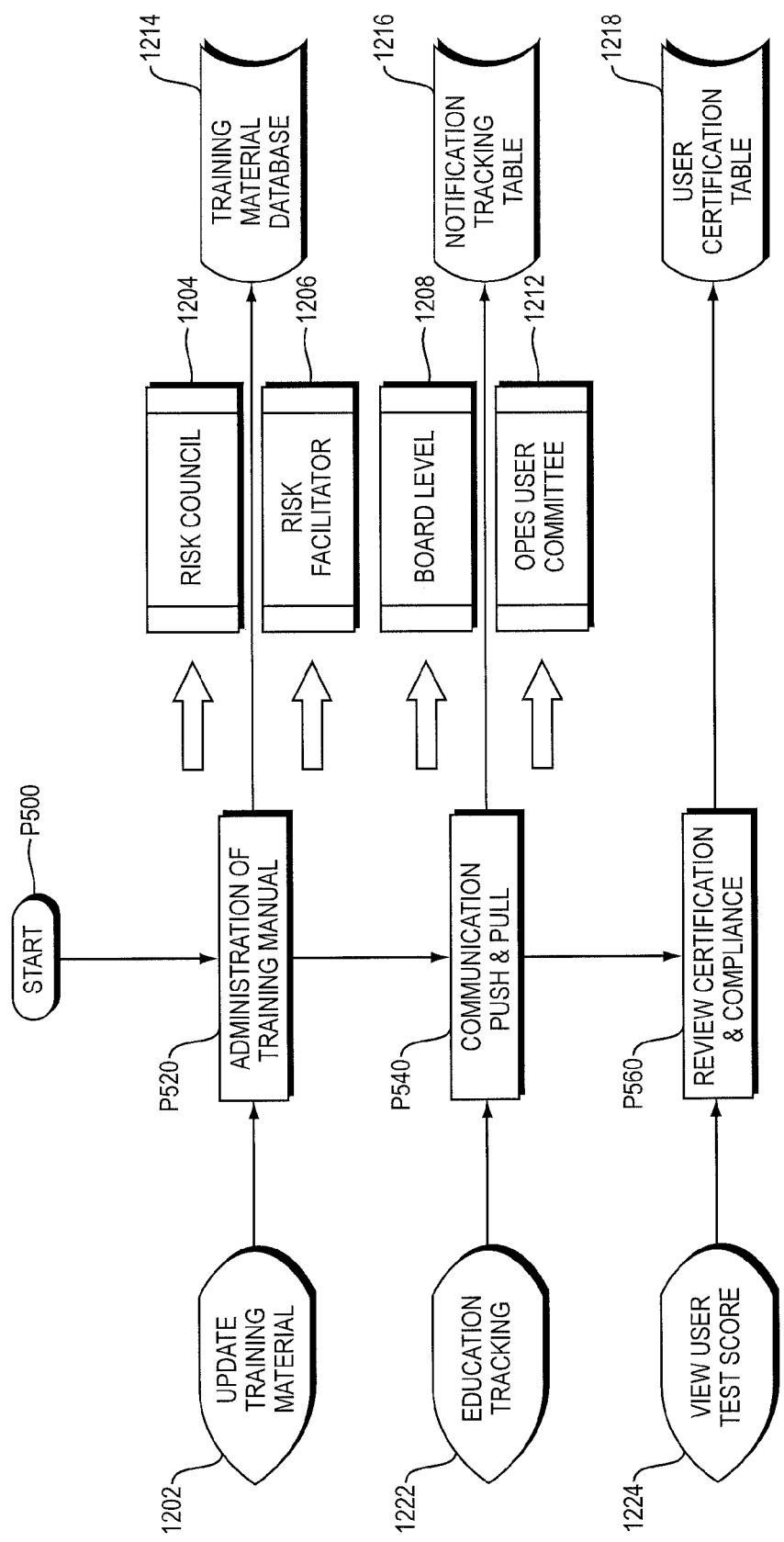
FIG. 12 illustrates a flow diagram of a training engine routine of the tool shown in FIG. 1B.

FIG. 12 is a diagram that illustrates the training engine P500 which manages the training and validation for those employees involved in the process. Module P520 manages the training administration to address user type (e.g., risk council 1204, risk facilitator 1206, board level 1208, operational users 1212) based on update training material input 1202. Module P540 manages communication both to and from users of training tools based on education tracking input 1222. There is a notification tracking table 1216 to manage who, when, and what is received. Module P560 manages certification and compliance with training programs with access provided to view user test scores at 1224 for use with user certification table 1218.

Figure 13:
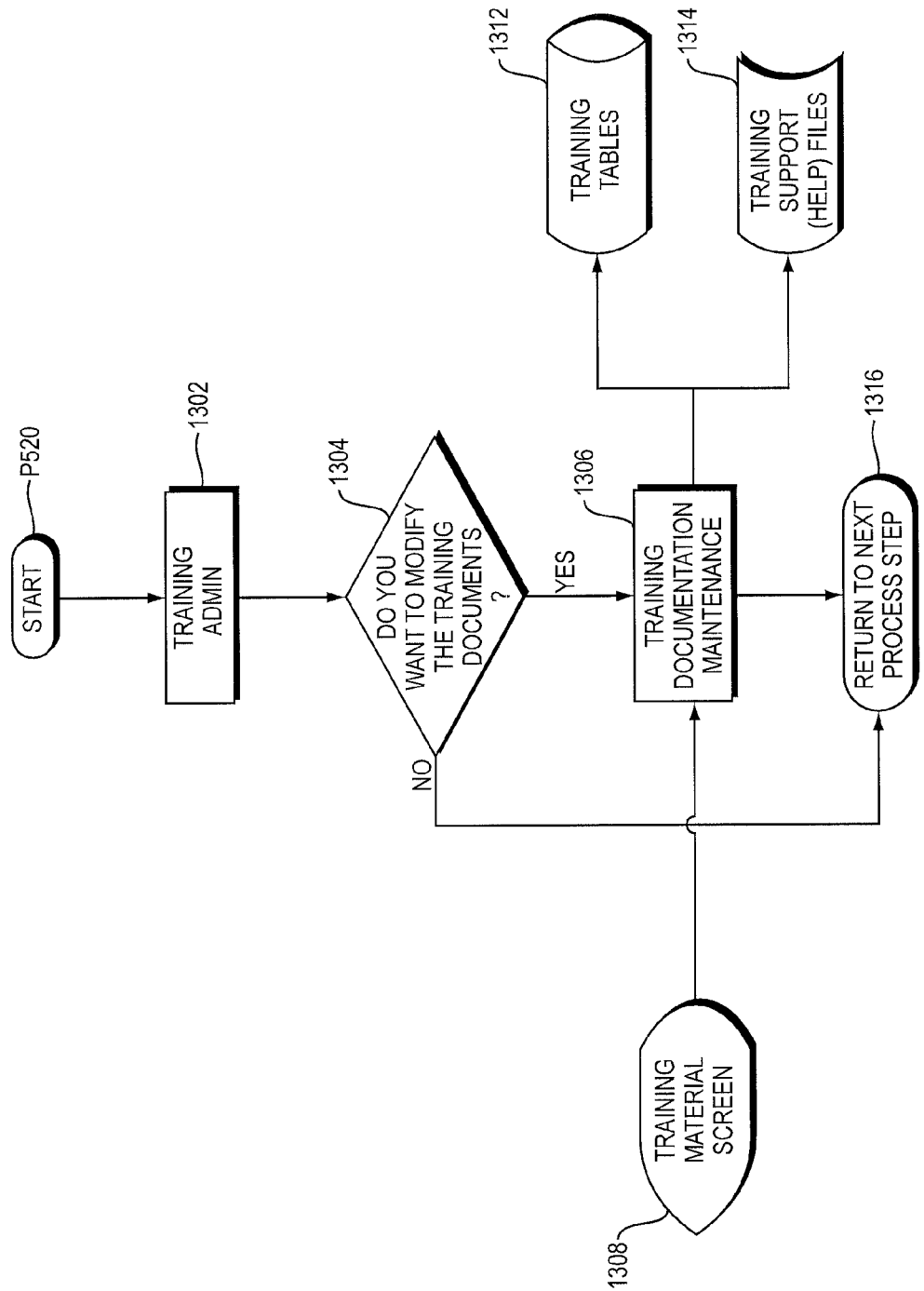
FIG. 13 illustrates a flow diagram of a training material administration subroutine of the routine shown in FIG. 12.

FIG. 13 is a diagram that provides details for the training material administration P520, showing how the tool collects training requirements from the tool owner. The tool maintains files of training materials and the associated requirements for the users. Initially the identified training administrator 1302 is queried 1304 for possible modifications to the training documents. If such modification is desired, training documentation maintenance 1306 may be invoked to update the training tables 1312 based on inputs at training material screen 1308. Help files are made available at 1314. The process resumes at 1316.

Figure 14:
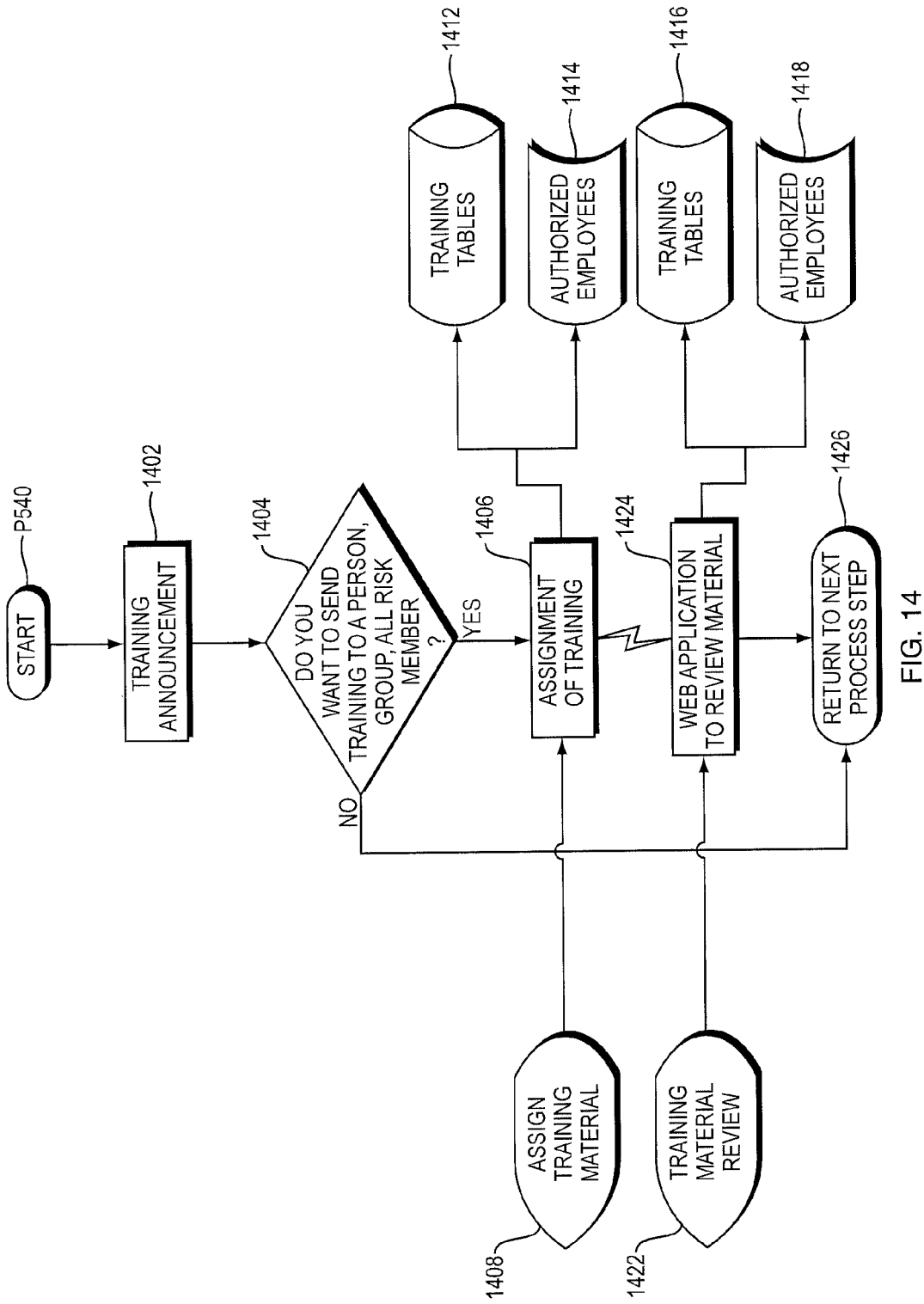
FIG. 14 illustrates a flow diagram of a training communications subroutine of the routine shown in FIG. 12.

FIG. 14 provides details for training communication management P540 relating to the distribution of training material. If there is a call for new or updated training to be completed or other training announcement 1402, the tool contacts the users through the application and pushes training down via query 1404 and assignment of training material 1408, 1406. Training material review with training tables 1412, 1416 for authorized employees 1414, 1418 occurs at 1422, 1424.

Figure 15:
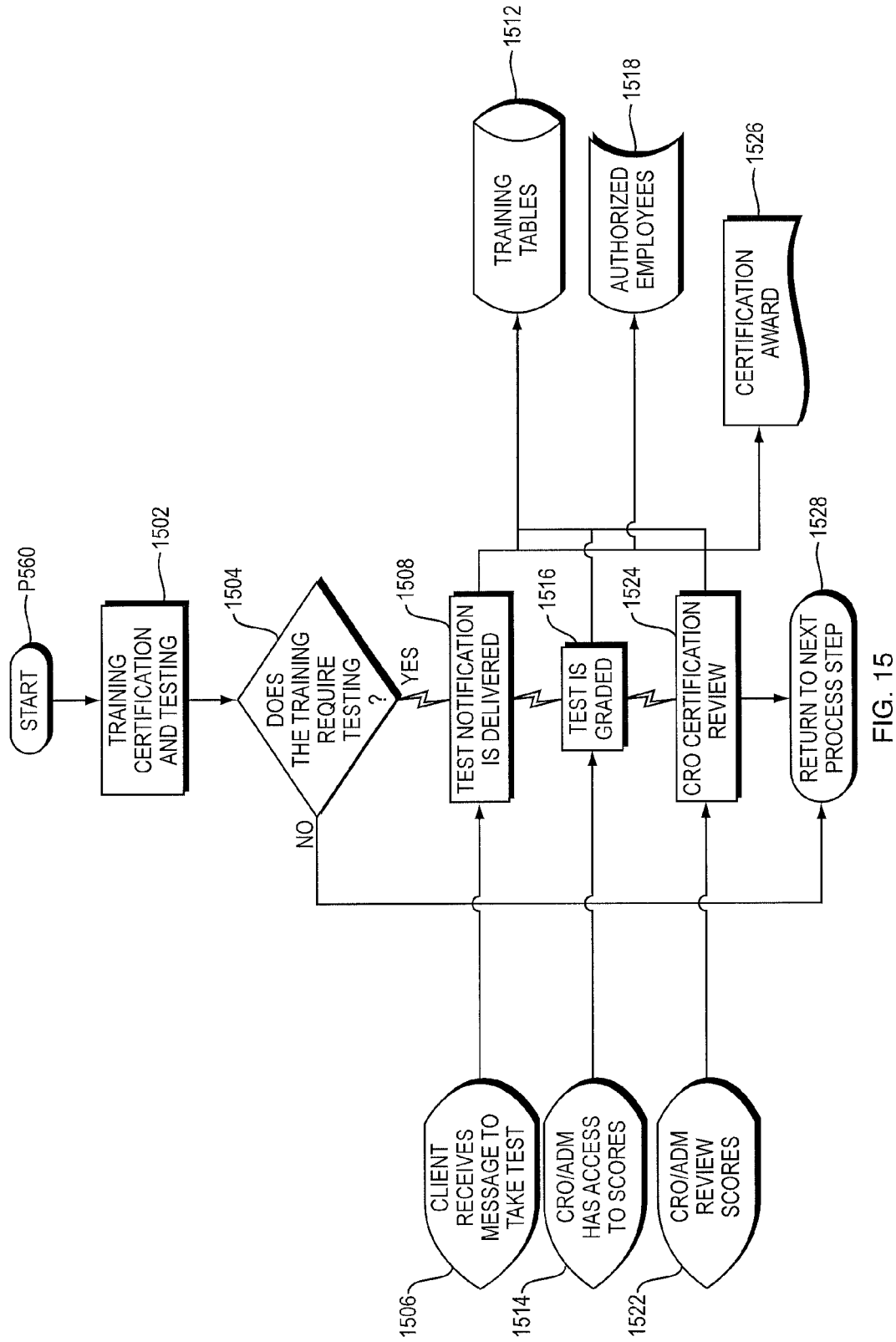
FIG. 15 illustrates a flow diagram of a training certification and compliance subroutine of the routine shown in FIG. 12.

FIG. 15 illustrates certification and compliance P560 to track, manage and report user training completion. If testing is required, the tool may conduct the testing and track results. If training certification and testing invoked at 1502 requires testing 1504, the user receives a message to take a test 1506; test notification is delivers 1508; the test is graded 1516; the certification is subject to review 1522, 1524 by the risk owner, resulting in a certification award 1526.

Figure 16:
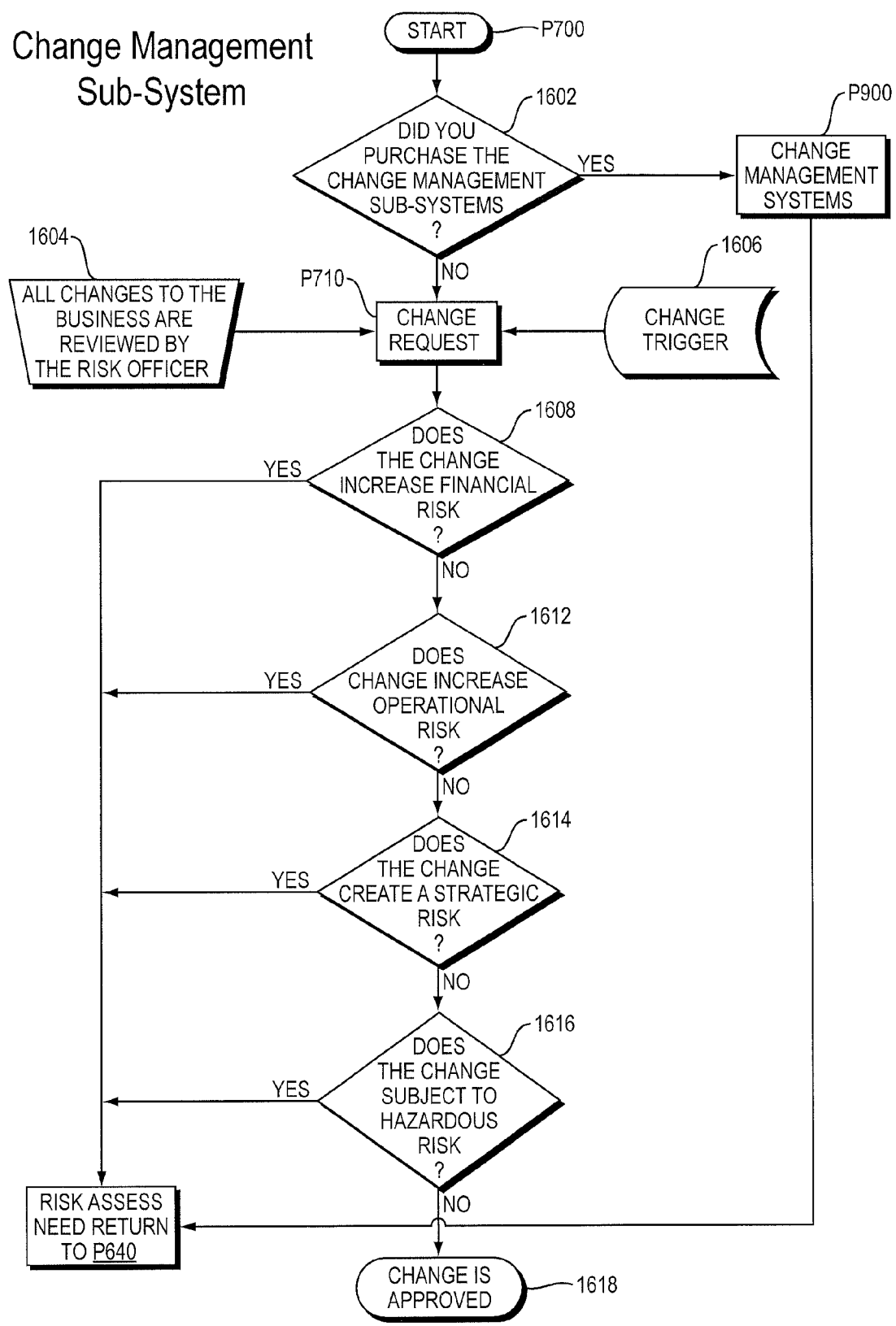
FIG. 16 illustrates a flow diagram of a change management routine of the tool shown in FIG. 1B.

FIG. 16 illustrates the change management engine P700. If the user has elected to include the basic change management tool to manage change P700 is triggered whenever change is considered. This routine queries the users through framing of the materiality of the change in question. If the change creates involves any type of material impact, then the tool activates a risk review of the implicated processes. If the user has engaged system P900 (not included in the application) a fully integrated Change management control system will provide change management tracking, validation and approval as a full-service automated validation system. For those who have not engaged P900, the tool may query the user through a series of questions to document the change P710 and identify if the change has a material impact on the organization 1608. If there is a material impact then the tool will query to see if the change impacts operations risk 1612, strategic risk 1614, or hazard risk 1616. If the answer to any of these is yes, it will request a risk assessment P640 be completed, if no, then the change is approved with no impact on the process risk 1618.

Figure 17:
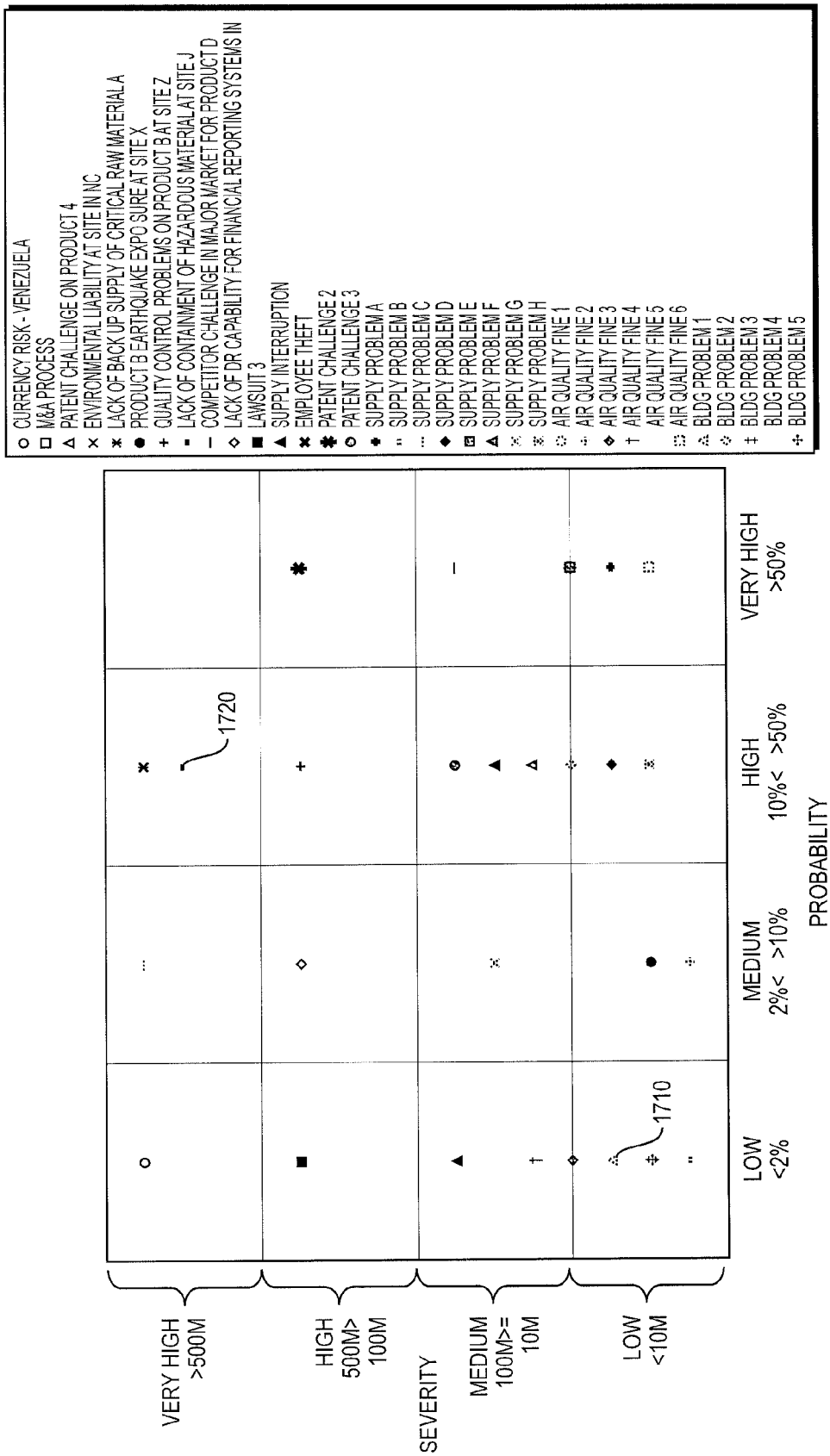
FIG. 17 is an example graphical representation of an enterprise risk map at a master level view for multiple business entities.

FIG. 17 illustrates an example graphical representation of an enterprise risk map at a master level view for multiple business entities. The example shows four probability/frequency grades or levels (low, medium, high, very high) and four materiality/severity grades or levels (low, medium, high, very high). A number of risk items is shown plotted on the risk map and denoted in the legend to the right. For example, a risk item such as item 1710 denoted as "building problem 1" has been assigned a low probability of occurrence and a low severity of impact. In contrast, risk item 1720 denoted as "lack of containment of hazardous material at site J" has been assigned a high probability of occurrence and a very high severity of impact. Both risk items 1710, 1720 are among the risk items associated with one particular business entity (e.g., Industrial Operations).

Figure 18:
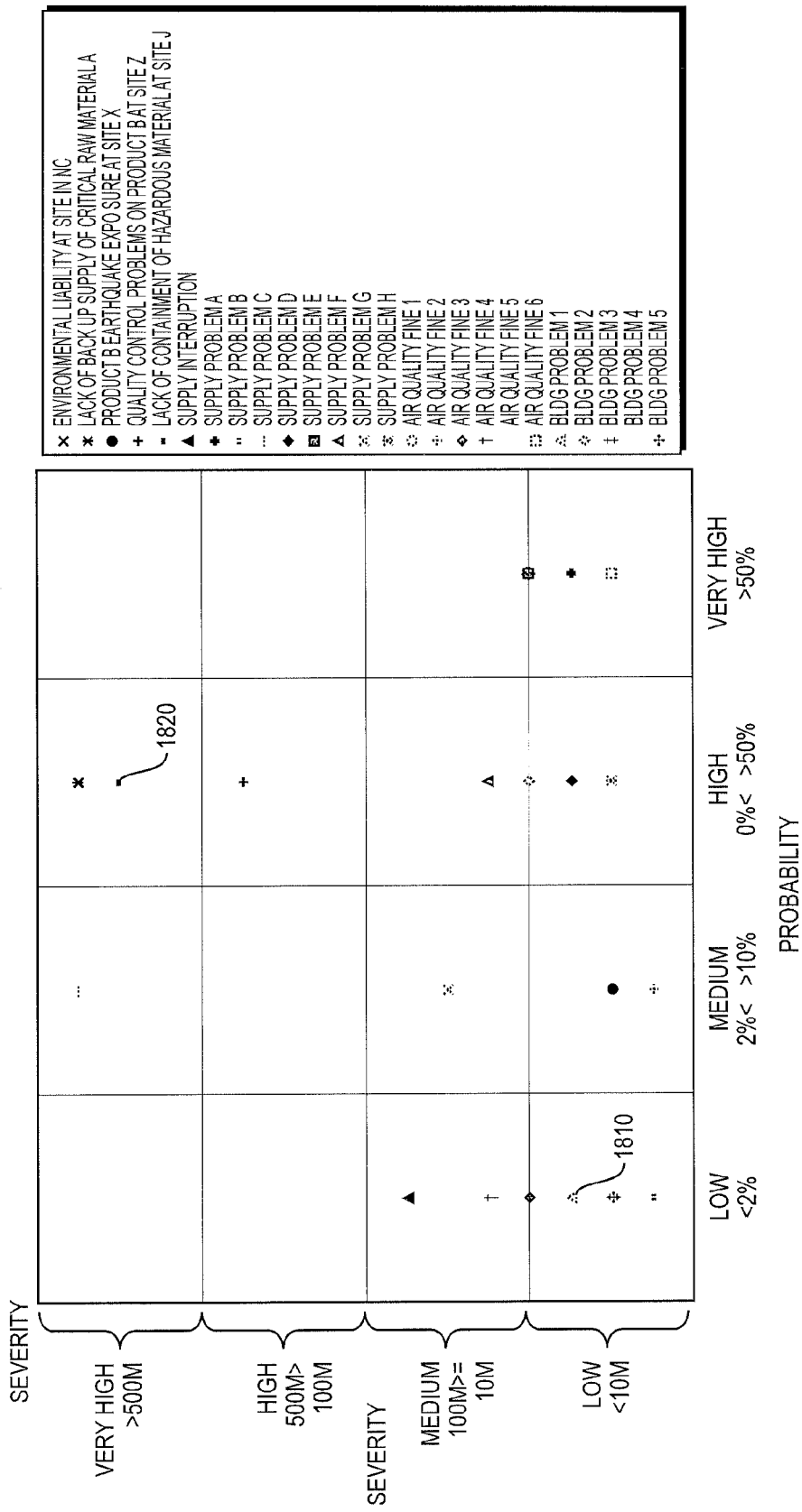
FIG. 18 is an example graphical representation of an enterprise risk map at the master level view for a single business entity.

FIG. 18 is an example graphical representation of an enterprise risk map at the master level view for a single business entity. In other words, this mapping shows only those risk items from the master level view of FIG. 17 that relate to the Industrial Operations business entity. Risk items 1810, 1820 correspond to risk items 1710, 1720 shown in FIG. 17. The risk items from other business entities that were visible in FIG. 17 are not shown in this view.

Figure 19:
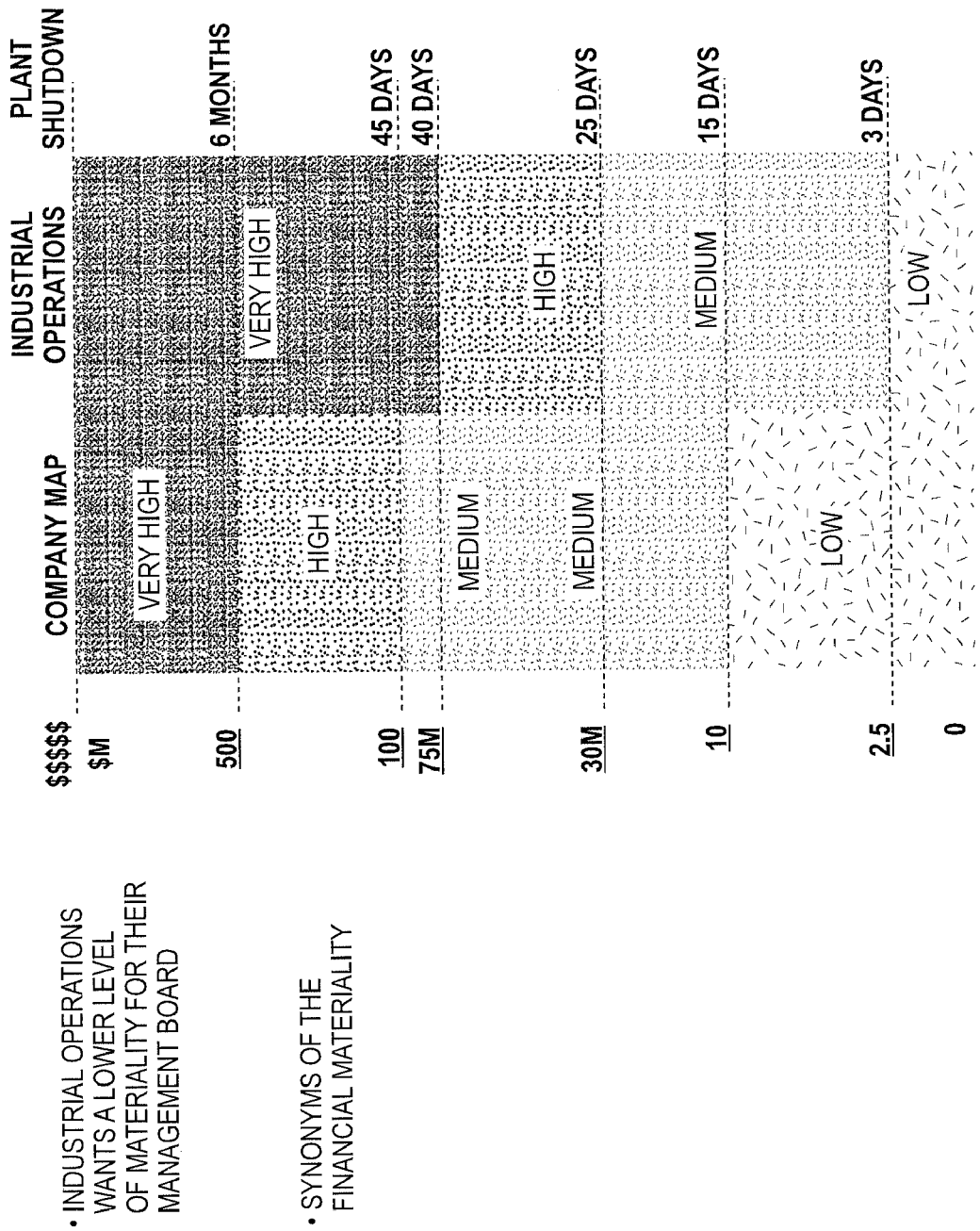
FIG. 19 illustrates materiality grades associated with two different levels.

FIG. 19 illustrates materiality grades associated with two different levels. As noted above, it may be beneficial for each business entity to manage risk at differing levels of materiality within the business entity itself relative to the overall risk materiality at the master level. As shown in FIG. 19, the materiality grades for the master level (called "company map" here) are low ($0 to $10M); medium ($10M to $100M); high ($100M to $500M); very high (greater than $500M). In contrast, the materiality grades that may be defined for the particular business entity, e.g., Industrial Operations, are low ($0 to $2.5M); medium ($2.5M to $30M); high ($30M to $75M); very high (greater than $75M). Note that synonyms for the corresponding financial materiality grades are also indicated.

Figure 20:
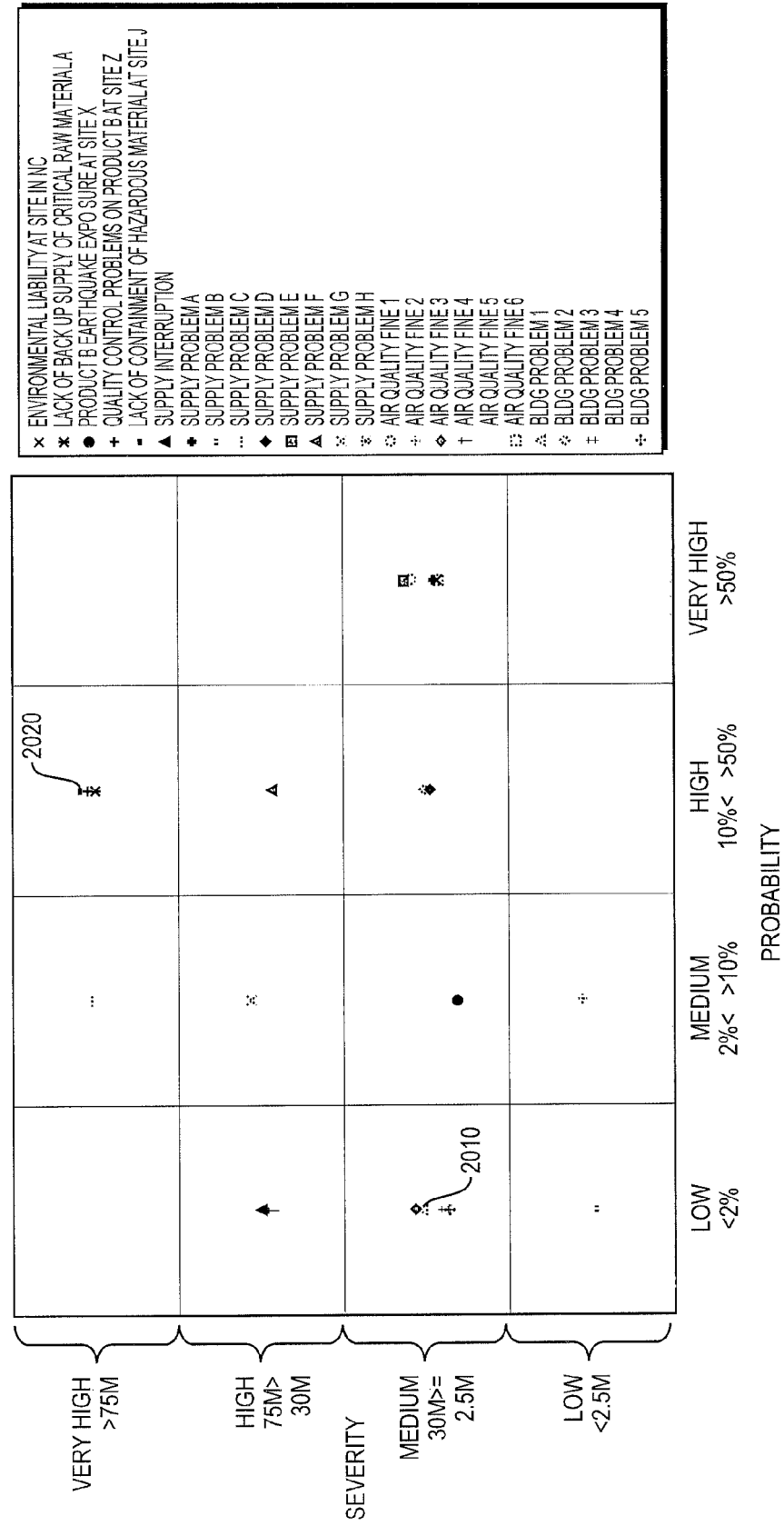
FIG. 20 is an example graphical representation of an enterprise risk map at the subordinate level view for a single business entity.

FIG. 20 is an example graphical representation of an enterprise risk map at the subordinate level view for a single business entity. In this case, the entity is Industrial Operations, using the information from FIG. 19. Risk item 2010, corresponding to risk item 1710, 1810 ("building problem 1"), in this business entity view has a severity/materiality grade of medium. Risk item 2020, corresponding to risk item 1720, 1820 ("lack of containment of hazardous material"), in this view has a severity/materiality grade of high.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer method of enterprise risk management comprising:
    defining a hierarchical organizational model, with a server, to represent an enterprise, the model having a master level and one or more levels subordinate to the master level, the master level having plural materiality grades and plural probability grades, each subordinate level including one or more entities having a reporting relationship to one of the entities in the preceding level, each entity having plural materiality grades;
    collecting risk information comprising plural risk items via a browser interface, each risk item associated with a particular entity in the hierarchical organizational model and having a materiality measure and a probability measure;
    storing the collected risk information in a risk information database;
    upon input from a user indicating approval for release of collected risk information, releasing said risk information to a next higher level in the hierarchical organizational model for review and approval by an other user through the browser interface;
    collecting a risk synonym for at least one of the plural master level materiality grades, the risk synonym tying the materiality measure to a language of the particular entity in the hierarchical organizational model;
    displaying selected portions of the collected risk information, via the browser interface, in an output view that for each selected risk item relates the probability measure to the plural probability grades and the materiality measure to either the plural master level materiality grades or the plural entity level materiality grades depending on a selected level.

2. The computer method of claim 1 wherein if the selected level is the master level, the output view relates the probability measure to the plural probability grades and the materiality measure to the plural master level materiality grades for risk items associated with at least one entity and at one or more subordinate levels, and if the selected level is any subordinate level, the output view relates the probability measure to the plural probability grades and the materiality measure to the plural entity level materiality grades for risk items associated with a selected entity at the selected level.

3. The computer method of claim 2 wherein the output view further relates the materiality measure to the plural entity level materiality grades for risk items associated with at least one subordinate entity at one or more levels subordinate to the selected level.

4. The computer method of claim 1 wherein the output view is presented in a graphical or tabular format.

5. The computer method of claim 1 wherein collecting includes collecting risk information input by users, each user associated with a corresponding entity.

6. The computer method of claim 1 further comprising updating periodically individual risk items stored in the risk information database.

7. The computer method of claim 1 further comprising updating the risk information on demand to add, delete or modify risk items.

8. The computer method of claim 1 wherein the materiality grades are defined in financial terms.

9. The computer method of claim 1 wherein the materiality grades are defined in synonymous terms.

10. Apparatus for enterprise risk management comprising:
    means for defining a hierarchical organizational model to represent an enterprise, the model having a master level and one or more levels subordinate to the master level, the master level having plural materiality grades and plural probability grades, each subordinate level including one or more entities having a reporting relationship to one of the entities in the preceding level, each entity having plural materiality grades;

means for collecting risk information comprising plural risk items, each risk item associated with a particular entity in the hierarchical organizational model and having a materiality measure and a probability measure;

means for storing the collected risk information in a risk information database;

means for releasing said risk information to a next higher level in the hierarchical organizational model for review and approval by an other user through the browser interface upon input from a user indicating approval for release of collected risk information;

means for collecting a risk synonym for at least one of the plural master level materiality grades, the risk synonym tying the materiality measure to a language of the particular entity in the hierarchical organizational model; and means for displaying selected portions of the collected risk information in an output view that for each selected risk item relates the probability measure to the plural probability grades and the materiality measure to either the plural master level materiality grades or the plural entity level materiality grades depending on a selected level.

11. Apparatus for enterprise risk management comprising a server and a browser interface, the apparatus operative to implement:

an organizational model routine for defining a hierarchical organizational model, with the server, to represent an enterprise, the model having a master level and one or more levels subordinate to the master level, the master level having plural materiality grades and plural probability grades, each subordinate level including one or more entities having a reporting relationship to one of the entities in the preceding level, each entity having plural materiality grades;

a collection routine for collecting risk information comprising plural risk items via the browser interface, each risk item associated with a particular entity in the hierarchical organizational model and having a materiality measure and a probability measure;

a storage routine for storing the collected risk information in a risk information database;

a release routine for releasing said risk information to a next higher level in the hierarchical organizational model for review and approval by an other user through the browser interface upon input from a user indicating approval for release of collected risk information;

a risk synonym collection routine for collecting a risk synonym for at least one of the plural master level materiality grades, the risk synonym tying the materiality measure to a language of the particular entity in the hierarchical organizational model; and a display routine for displaying selected portions, via the browser interface, of the collected risk information in an output view that for each selected risk item relates the probability measure to the plural probability grades and the materiality measure to either the plural master level materiality grades or the plural entity level materiality grades depending on a selected level.

12. The apparatus of claim 11 wherein if the selected level is the master level, the output view relates the probability measure to the plural probability grades and the materiality measure to the plural master level materiality grades for risk items associated with at least one entity and at one or more subordinate levels, and if the selected level is any subordinate level, the output view relates the probability measure to the plural probability grades and the materiality measure to the plural entity level materiality grades for risk items associated with a selected entity at the selected level.

13. The apparatus of claim 12 wherein the output view further relates the materiality measure to the plural entity level materiality grades for risk items associated with at least one subordinate entity at one or more levels subordinate to the selected level.

14. The apparatus of claim 11 wherein the output view is presented in a graphical or tabular format.

15. The apparatus of claim 11 wherein the collection routine collects risk information input by users, each user associated with a corresponding entity.

16. The apparatus of claim 11 wherein individual risk items stored in the risk information database are updated periodically and/or on demand.

17. The apparatus of claim 11 wherein the materiality grades are defined in financial terms and/or in synonymous terms.

18. A computer program product for enterprise risk management, the computer program product comprising a computer usable medium having computer readable code thereon, including program code which:

defines a hierarchical organizational model to represent an enterprise, the model having a master level and one or more levels subordinate to the master level, the master level having plural materiality grades and plural probability grades, each subordinate level including one or more entities having a reporting relationship to one of the entities in the preceding level, each entity having plural materiality grades;

collects risk information comprising plural risk items, each risk item associated with a particular entity in the hierarchical organizational model and having a materiality measure and a probability measure;

stores the collected risk information in a risk information database;

upon input from a user indicating approval for release of collected risk information, releases said risk information to a next higher level in the hierarchical organizational model for review and approval by an other user through the browser interface;

collects a risk synonym for at least one of the plural master level materiality grades, the risk synonym tying the materiality measure to a language of the particular entity in the hierarchical organizational model; and outputs selected portions of the collected risk information in an output view that for each selected risk item relates the probability measure to the plural probability grades and the materiality measure to either the plural master level materiality grades or the plural entity level materiality grades depending on a selected level.

19. The computer method of claim 1 wherein outputting selected portions of the collected risk information includes outputting the materiality measure in terms of the risk synonym.

20. The apparatus of claim 11 wherein the output routine is further configured to output the materiality measure in terms of the risk synonym.

* * * * *